United States Patent
Schiefelbein, Jr.

(10) Patent No.: US 7,909,091 B2
(45) Date of Patent: Mar. 22, 2011

(54) APPARATUS HAVING IMPROVED INTERLOCKING UNITS FOR FLEXIBLY RESTRAINING SERVICE LOOPS IN AN OIL DERRICK TO PREVENT ENTANGLING OF THE LOOPS

(75) Inventor: John P. Schiefelbein, Jr., Huntington Beach, CA (US)

(73) Assignee: Delafield Corporation, Duarte, CA (US)

( * ) Notice: Subject to any disclaimer, the term of this patent is extended or adjusted under 35 U.S.C. 154(b) by 0 days.

(21) Appl. No.: 12/590,635

(22) Filed: Nov. 12, 2009

(65) Prior Publication Data

US 2010/0059635 A1    Mar. 11, 2010

Related U.S. Application Data

(63) Continuation-in-part of application No. 12/157,093, filed on Jun. 6, 2008.

(60) Provisional application No. 61/072,155, filed on Mar. 29, 2008.

(51) Int. Cl.
*E21B 19/00* (2006.01)
*E21B 19/22* (2006.01)

(52) U.S. Cl. ................ 166/75.11; 166/77.1; 175/207

(58) Field of Classification Search .............. 166/75.11, 166/77.1; 175/207; 248/60
See application file for complete search history.

(56) References Cited

U.S. PATENT DOCUMENTS

| | | | | |
|---|---|---|---|---|
| 379,425 A | * | 3/1888 | Trask | 248/60 |
| 1,409,760 A | * | 3/1922 | O'Marr | 175/207 |
| 3,757,387 A | * | 9/1973 | Bush et al. | 166/241.7 |
| 4,681,169 A | * | 7/1987 | Brookbank, III | 166/385 |

* cited by examiner

*Primary Examiner* — William P Neuder
*Assistant Examiner* — Cathleen R Hutchins
(74) *Attorney, Agent, or Firm* — Thomas P. Rozsa

(57) ABSTRACT

An apparatus for flexibly restraining service loops in an oil derrick to prevent entangling of the loops, including a plurality of identical apparatus wherein each apparatus is positioned at different longitudinal level to restrain the service loops. The apparatus contains multiple improved interlocking units having a shape of the sleeve. Each unit includes first and second members and intra-unit affixing members in addition to an adhesive to affix the members and service loop together. Each member is an insert steel enhanced rubber structure. A transverse interconnecting ring is connected to the inner insert steel through which service loops are retained together by a cable.

33 Claims, 13 Drawing Sheets

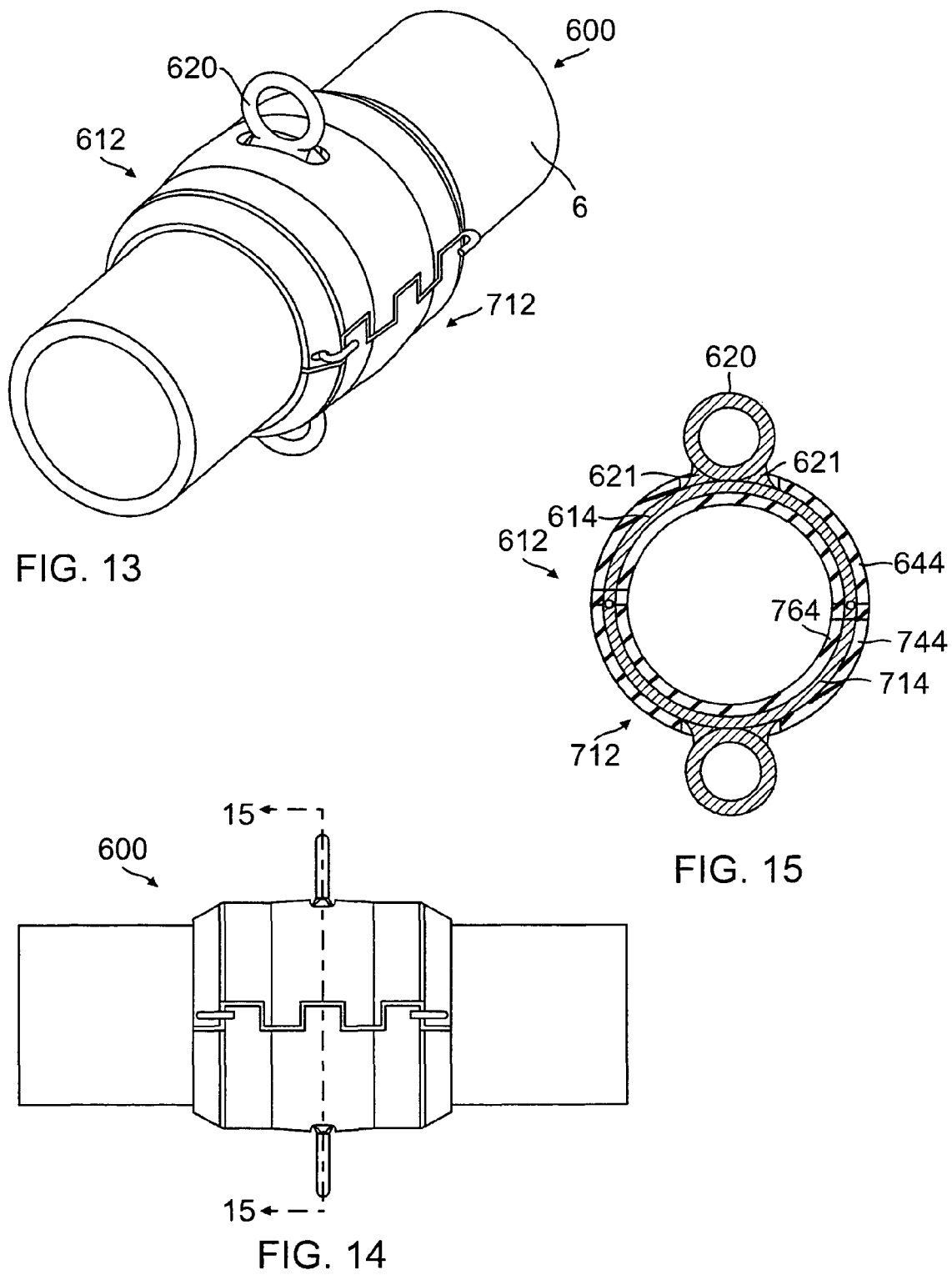

APPARATUS HAVING IMPROVED INTERLOCKING UNITS FOR FLEXIBLY RESTRAINING SERVICE LOOPS IN AN OIL DERRICK TO PREVENT ENTANGLING OF THE LOOPS

This application is a continuation-in-part of U.S. patent application Ser. No. 12/157,093 filed on Jun. 6, 2008 which claims the benefit of U.S. Provisional Patent Application No. 61/072,155 filed on Mar. 29, 2008.

BACKGROUND OF THE INVENTION

1. Field of the Invention

The present invention is related to oil drilling equipment, and more particularly, to an apparatus having improved interlocking units to restrain service loops which transfer electrical, hydraulic and compressed-air power to the oil derrick top drive.

2. Description of the Prior Art

Referring to FIG. 1, a top drive drilling system which has a notation number of 3 in FIG. 1, is a common piece of machinery in an oil well drilling tower 1 in the oil drilling industry. The top drive 3 includes an AC or DC motor or a hydraulic motor which is connected to a speed reducing (torque increasing) gearbox, so that it can rotate the drill pipe to bore an oil well. The top drive is mounted in the drilling derrick and travels up and down under a control of a piece of traveling equipment 2.

Referring again to FIG. 1, there is illustrated an umbilical system 6 which is commonly called service loops. The service loops 6 are part of hoses 5 of the machinery in the oil well drilling tower, where each of the hoses transfers the respective electrical, hydraulic and compressed-air power to the top drive. There are various combinations of hoses, wires and cables that pass through the inside diameters of the service loops. Most top drive utilize a combination of two to four service loops which have approximately equal length. Each service loop at one end is attached to the derrick (or mast), and at the opposite end is connected to the top drive. As the top drive travels up and down, the service loops move accordingly up and down in the longitudinal direction. In addition, they have a bending movement in the transverse direction, which forms the respective bend radii.

The service loops 6 of the hoses vary from about 2 inches to 7 inches in diameter. In addition, there are also variations of the hose structure and materials according to their usages in the drilling process. For example, a hydraulic pressure could be up to 3000 psi, and therefore, a hose to transfer the hydraulic fluid must be mechanically enhanced by having a sufficient thickness and an appropriate material structure. In general, the service loops have a composite structure to achieve reinforced mechanical properties. The composite structure is comprised of an inner liner, a middle braid and an outer liner. The inner and outer liners are made of thermoplastic materials or rubber. The middle braid is the composite of the thermoplastics and enhanced polymeric threads or metal wires. Therefore, the mechanically enhanced hoses have large longitudinal rigidities.

It will be appreciated that due to the variations of the hose diameters, material and structure which all affect the longitudinal flexibility of the hoses, each service loop does not always have the same bend radius. The hoses having a smaller diameter usually have a smaller bend radius, and the hoses having a larger diameter have a larger bend radius. For example, in general, hoses with two inches in diameter will have 30 inches in bend radius, hoses having three inches in diameter will have a bend radius of 42 inches, and hoses having four and half inches in diameter will have a bend radius of 48 inches. Therefore, the bottoms of the service loops travel in different paths when all the Loops having the same length travel in the longitudinal direction.

The variation in paths during operation of the machinery causes the loops to become entangled. When this happens, loops with the larger diameter have the tendency to force loops with the smaller diameter into unnatural positions, which results in premature failure of the loops with the smaller diameter. In this situation, an environmental condition such as a strong wind also plays a factor to accelerate the failure of the loops. In addition, in some cases two or more loops with the smaller diameter can displace a loop with the larger diameter, which can cause problems including broken loops.

If the loop failure happens, it will not only cause a loss in economic value due to costs to replace the damaged loops and down time for replacing the loops, but also create a hazardous situation such as leakage of the high pressured air or fluids to machine operators. Therefore, finding a solution to this problem becomes an industry priority.

Over the years there have been several attempts to design metal clamps to wrap around the loops so that proper spacing and consistent travel paths could be maintained. However, these attempts have failed due to the continual forces on the rigid clamps and the harsh environment the clamps are subjected to.

In order to overcome these difficulties, there was disclosed and claimed in the parent application Ser. No. 12/157,093 filed by the same inventor an apparatus for flexibly restraining service loops in an oil derrick to prevent entangling of the loops. The apparatus is comprised of a plurality of identical apparatus wherein each apparatus is positioned at a different longitudinal level to restrain the service loops. Each apparatus is comprised of a plurality of interlocking units, wherein each unit is comprised of a central steel ring which is adhesively bonded to a braid of a service loop penetrating therethrough and exteriorly affixed to first and second interconnecting rings. A first flexible cable and second flexible cable connect the respective first and second interconnecting rings of the units of each apparatus. Therefore, the significant improvement disclosed and claimed in the parent application provided service loops which were flexibly restrained to facilitate a uniform path and bend radius when the service loops travel longitudinally during operation of an oil well drilling machine. This improvement provided a significant reduction in damage to the service loops during operation.

The invention as disclosed in the parent case required retrofitting the service loops by opening up the outer covering and installing the improvement. This could not be performed on site in the field and required installation at an off-site location. The is a significant need for an improved apparatus which enables installation over the existing covering of the service loops and can be performed at the oil drilling platform.

SUMMARY OF THE INVENTION

The present invention is an apparatus for flexibly restraining service loops which are part of hoses in an oil derrick to prevent entangling of the loops, comprising a plurality of identical apparatus wherein each apparatus is positioned at different longitudinal levels to restrain the service loops, so that the service loops will have the same path and bend radius when they travel longitudinally during operation of an oil well drilling machine to minimize damage of the service loops.

In a preferred embodiment regarding structural configuration of multiple identical apparatus, each apparatus is comprised of three or more interlocking units which are flexibly connected together through identical first and second flexible cables, wherein three units are positioned in a same transverse level to affix the respective three service loops. In addition, each of the interlocking units has an identical structural configuration, comprising a central steel ring which is adhesively bonded to a middle section of braid of a service loop positioned to penetrate therethrough and is also exteriorly affixed to first and second interconnecting rings which are connected to the respective first and second flexible cables. Therefore, the service loops are flexibly restrained to have a uniform path and bend radius when they travel longitudinally.

Each of three steel rings is a circular upward cylindrical wall which is longitudinally positioned to adhesively bond to the braid of a service loop and affixed to the first and second interconnecting rings. The interconnecting rings are positioned to align with a plane which is transverse to the longitudinal cylindrical wall of the steel ring, wherein their ring diameters are further aligned with a diameter of the steel ring, so that the first and second interconnecting rings are symmetrically positioned relative to the centrally positioned steel ring.

The interlocking unit of the present invention as set forth in this continuation-in-part patent application is comprised of various improved embodiments as compared with a basic model having the ring structure as described in the parent case. A first improved interlocking unit has a shape similar to an axle sleeve, comprising first and second symmetrical members, which are affixed by a plurality of attachment bands. Each member, which is half of the unit, comprises an insert steel enhanced molded rubber structure, comprising an inner insert steel section and an outer molded rubber section, which are combined together in a sandwich fashion.

The inner insert steel section is an arcuate plate, wherein a plurality of threaded openings penetrate therethrough and an interconnecting ring is affixed at a middle position on the exterior surface of the inner insert steel section. The ring is additionally positioned to be aligned with a plane which is transverse to the longitudinal orientation of the unit. The outer molded rubber section is an arcuate hollow structure including first and second closed transverse sides, an exterior surface, an interior surface and an a open middle layer of space to thereby form two longitudinal openings between the exterior surface and the interior surface of the molded rubber section. On the exterior surface of the molded rubber section there are opposite disposed ring receiving openings for positioning an interconnecting ring from each respective half of the inner insert steel sections, and a plurality of attachment band receiving openings for positioning the respective attachment bands to thereby affix the first and second inner insert steel sections together.

When assembling the first improved interlocking unit, the first and second members are affixed together and further adhered by adhesive placed at the interface between the unit and service loop. The affixation is additionally enhanced by fasteners including the attachment bands and screws which penetrate through the respective bands to connect to respective threaded openings of the respective two inner insert steel sections of a member. The fasteners function as first intra-unit affixing means.

A second improved interlocking unit as described in this continuation-in-part application has the same shape of an axle sleeve as the first improved interlocking unit, and also comprises first and second symmetrical members. However, the first and second members of the second improved unit have a different structure which serves as second intra-unit affixing means for connecting them together, as compared with the first intra-unit affixing means of the first improved interlocking unit as described in this continuation-in-part patent application.

Each symmetrical member of the second improved interlocking unit is an inner insert steel section with an enhanced molded rubber structure, comprising an inner insert steel section and an outer molded rubber section. The inner insert steel section comprises a plurality of forward extensions and corresponding recesses along the respective first and second longitudinal interconnecting edges, wherein a respective one extension connects to a respective one recess in series. In addition, an identical pin receiving hole penetrates through each forward extension, so that the identical pin holes are aligned with the longitudinal orientation of each of the two longitudinal interconnecting edges.

Similar to the extensions and recesses of the inner insert steel sections, the outer molded rubber section also comprises corresponding extensions and recesses on the respective exterior surface and interior surface along each of two longitudinal openings of the outer molded rubber section. Therefore, in manufacturing each member the extensions and corresponding recesses of the insert steel sections are positioned between the respective extensions and corresponding recesses on the respective exterior surface and interior surface along each of the two longitudinal openings of the outer molded rubber sections.

When assembling the second improved interlocking unit, the first and second members are first positioned to tightly surround the service loop at an appropriate location, wherein their extensions and corresponding recesses are respectfully matched to each other to form a cylindrical structure. Therefore, the first and second longitudinal interconnecting edges of the first inner insert steel section matches corresponding recesses in the second inner insert steel section and the interconnecting sections of the second inner insert steel section matches the corresponding recesses in the first inner insert steel section. Therefore, first and second identical pins penetrate through the pin receiving holes of the respective first and second members to thereby connect the first and second member together along the respective two longitudinal sides. In this setting, the extensions and corresponding recesses of the respective first and second members, the pin receiving holes of the respective first and second inner insert steel sections, and the two pins serve as the respective intra-unit affixing means. In addition, adhesive is placed onto an interface location between the unit and service loop, including the interior surface of the first member, the interior surface of the second member, and the outer layer of the service loop.

The adhesion forces provided by the adhesives positioned on the interface of the unit and service loop play a predominant role to affix the improved interlocking unit and the service loop together, in addition to mechanical forces provided by the intra-unit affixing means, which additionally contribute the affixation of the unit to the service loop.

For all of the variations as described in the parent case and in this continuation-in-part case, in the preferred embodiment, the first flexibly restraining cable at its first end penetrates through the first interconnecting ring of the second interlocking unit, and the first end is then crimped after forming a loop to connect to the first interconnecting ring of the third unit, whereas its second end is also crimped after forming another loop to connect to the first interconnecting ring of the first unit. The second flexibly restraining cable is similarly connected to the second interconnecting rings of the respective interlocking units. Therefore, the first and third service loops are flexibly restrained to thereby have a limited transverse vibrational movement and the second service loop can have a limited sliding transverse movement between the first and third service loops when they travel longitudinally, so that their transverse movement reduces stresses applied to the apparatus which results in a reduced strain on the apparatus to thereby lead to a long usable life of the apparatus of the present invention.

In another preferred embodiment for all variations regarding flexibly connecting three interlocking units, four identical cables are used, wherein a first flexibly restraining cable is affixed to the first interconnecting rings of the respective first and second interlocking units, a second flexibly restraining cable is affixed to the second interconnecting rings of the respective first and second interlocking units, a third flexibly restraining cable is affixed to the first interconnecting rings of the respective second and third interlocking units, and a fourth flexibly restraining cable is affixed to the second interconnecting rings of the respective second and third interlocking units. Therefore, three service loops will have restrained transverse vibrational movement to reduce stresses applied to the apparatus which results in a reduced strain on the apparatus to thereby lead to a long usable life of the apparatus of the present invention.

In an additional embodiment regarding structural variations of the steel ring in the parent case, a varied steel ring is manufactured by combining four pieces of arcuate wall instead of using a single circular wall, comprising a first outer piece which is threadedly connected to ends at one side of respective first and second inner pieces, and a second outer piece which is threadedly connected to ends at an opposite side of the respective first and second inner pieces, so that application of the varied steel ring significantly reduces the manufacturing costs by enabling the use of commercially available mechanically strengthened hoses in manufacturing of the service loops incorporating the present invention, wherein there is only cut a circular strip of an outer liner of a commercial hose to thereby adhesively bond the varied steel ring to a middle section of braid of the hose, which is eventually a service loop.

In a further embodiment regarding achieving a controlled tear-drop shaped loop for all variations in the parent case and this continuation-in-part case the apparatus is comprised of an additional three longitudinal supporting members such as rods or cables where their upper and lower ends are affixed. Each of the supporting members penetrates through the respective repeating first interconnecting rings of the respective repeating first, second and third interlocking units of the apparatus wherein a plurality of identical apparatus are positioned at different longitudinal positions of the service loops, so that the straight supporting members support service loops at one side to thereby push the other side of the service loops outward, which forms controlled tear-drop shaped loops of the service loops in operation of the oil well drilling machine.

The present invention has a second preferred embodiment of the apparatus regarding varied structural configurations of the multiple identical apparatus. Each apparatus is comprised of first and third interlocking units which only have the respective single interconnecting rings to affix the respective steel rings and a second interlocking unit which have first and second interconnecting rings, wherein a first looped flexibly restraining cable connects the interconnecting ring of the first unit and the first interconnecting ring of the second interlocking unit, and a second looped flexibly restraining cable connects the interconnecting ring of the third unit and the second interconnecting ring of the second interlocking unit, which results in the ring diameters of all the interconnection rings to align with a central line penetrating through diameters of the respective service loops. In this setting, the loops are flexibly restrained, so that they have limited transverse vibrational movement to reduce stresses applied to the apparatus, which results in a reduced strain on the apparatus to thereby lead to long usable life of the apparatus of the present invention.

Therefore, it is an object of the present invention to provide an apparatus for flexibly restraining service loops which are part of hoses in an oil derrick to prevent entangling of the loops, comprising a plurality of identical apparatus wherein each apparatus is positioned at different longitudinal levels to restrain the service loops, so that the service loops will have the same path and bend radius when they travel longitudinally during operation of an oil well drilling machine to minimize damage of the service loops.

It is another object of the present invention to provide a preferred embodiment regarding structural configurations of multiple identical apparatus. Each apparatus is comprised of three interlocking units which are flexibly connected together through identical first and second flexible cables, wherein the three units are positioned in a same transverse level to affix the respective three service loops. In addition, each of the interlocking units has an identical structural configuration, comprising a central steel ring which is adhesively bonded to a middle section of braid of a service loop positioned to penetrate therethrough and is also exteriorly affixed to first and second interconnecting rings which are connected to the respective first and second flexible cables. Therefore, the service loops are flexibly restrained to have a uniform path and bend radius when they travel longitudinally.

It is a further object of the present invention to provide each of three steel rings being a circular upward cylindrical wall which is longitudinally positioned to adhesively bond the braid of a service loop and affixed to the first and second interconnecting rings. The interconnecting rings are positioned to align with a plane which is transverse to the longitudinal cylindrical wall of the steel ring, wherein their ring diameters are further aligned with a diameter of the steel ring, so that the first and second interconnecting rings are symmetrically positioned relative to the centrally positioned steel ring.

It is an additional object of the present invention to provide the first and second flexibly restraining cables. The first cable at its first end penetrates through the first interconnecting ring of the second interlocking unit, and the first end is then crimped after forming a loop to connect to the first interconnecting ring of the third unit, whereas its second end is also crimped after forming another loop to connect to the first interconnecting ring of the first unit. The second flexibly restraining cable is similarly connected to the second interconnecting rings of the respective interlocking units. Therefore, the first and third service loops are flexibly restrained to thereby have a limited transverse vibrational movement and the second service loop can have a limited sliding transverse movement between the first and third service loops when they travel longitudinally, so that their transverse movement reduces stresses applied to the apparatus which results in a reduced strain on the apparatus to thereby lead a long usable life of the apparatus of the present invention.

It is another further object of the present invention to provide another preferred embodiment regarding flexibly connecting three interlocking units, wherein four identical cables are used. The first flexibly restraining cable is affixed to the first interconnecting rings of the respective first and second interlocking units, the second flexibly restraining cable is affixed to the second interconnecting rings of the respective first and second interlocking units, the third flexibly restraining cable is affixed to the first interconnecting rings of the respective second and third interlocking units, and the fourth flexibly restraining cable is affixed to the second interconnecting rings of the respective second and third interlocking units. Therefore, three service loops will have restrained transverse vibrational movement to reduce stresses applied to the apparatus which results in a reduced strain of the apparatus to thereby lead a long usable life of the apparatus of the present invention.

It is a further object of the present invention to provide an additional embodiment regarding structural variations of the steel ring, wherein a varied steel ring is manufactured by combining four pieces of arcuate wall instead of using a single circular wall. The ring is comprised of a first outer piece which is threadedly connected to ends at one side of respective first and second inner pieces, and a second outer piece which is threadedly connected to ends at opposite sides of the respective first and second inner pieces. Therefore, application of the varied steel ring significantly reduces the manufacturing costs by enabling the use of commercially available mechanically strengthened hoses in the manufacture of the service loops incorporating the present invention, wherein there only needs to be cut a circular strip of an outer liner of a commercial hose to thereby adhesively bond the varied steel ring to a middle section of braid of the hose, which is eventually a service loop.

It is an object of the present invention to provide a further embodiment regarding achievement of a controlled tear-drop shaped loop. In the embodiment, the apparatus having the preferred multiple apparatus is comprised of additional three longitudinal supporting members such as rods or cables where their upper and lower ends are affixed. Each of the supporting members penetrates through the respective repeating first interconnecting rings of the respective repeating first, second and third interlocking units of the apparatus wherein a plurality of identical apparatus which are positioned at different longitudinal positions of the service loops, so that the straight supporting members support service loops at one side to thereby push the other side of the service loops outward, which forms controlled tear-drop shaped loops of the service loops in operation of the oil well drilling machine.

It is further object of the present invention to provide a second preferred embodiment of the apparatus incorporating varied structural configurations of the multiple identical apparatus. In the embodiment, each apparatus is comprised of first and third interlocking units which only have the respective single interconnecting rings to affix the respective steel rings and a second interlocking unit which has first and second interconnecting rings, wherein a first looped flexibly restraining cable connects the interconnecting ring of the first unit and the first interconnecting ring of the second interlocking unit, and a second looped flexibly restraining cable connects the interconnecting ring of the third unit and the second interconnecting ring of the second interlocking unit, which results in the ring diameters of all the interconnection rings being aligned with a central line penetrating through diameters of the respective service loops. In this setting, the loops are flexibly restrained so that they have limited transverse vibrational movement to reduce stresses applied to the apparatus, which results in a reduced strain on the apparatus to thereby prolong the life of the apparatus of the present invention.

It is an additional object of the present invention to provide additional variations of the structural configurations of the present invention apparatus, where the variations are as follows:

(1) the apparatus is comprised of at least two identical apparatus;

(2) each identical apparatus is comprised of at least two interlocking units for restraining at least two service loops;

(3) each interlocking unit comprised of a central steel ring is connected to the respective first and second interconnecting rings, wherein the interconnecting rings are positioned non-symmetrically relative to the central steel ring as long as the interlocking unit can function appropriately;

(4) a varied steel ring is comprised of at least two pieces of arcuate wall;

(5) each interconnecting ring is affixed including being welded to the central steel ring; and (6) each interconnecting ring has any appropriate shape including a "D" shape.

It is additional object of the present invention to provide preferred embodiments of the first and second improved interlocking units which can be assembled over the outer covering of the service loops and therefore can be installed on-site. The improved interlocking units have a shape similar to a sleeve, which include respective first and second symmetrical members, and respective intra-unit affixing means. Each member, which is one half of the unit, is an insert steel enhanced molded rubber structure having a shape of a half of the outer sleeve, comprising an inner insert steel section and an outer molded rubber section, which are combined together in a sandwich fashion.

It is another object of the present invention first improved interlocking unit to provide each symmetrical member comprising an inner insert steel section and outer molded rubber section. The inner insert steel section is an arcuate plate, wherein a plurality of threaded openings penetrate therethrough and an interconnecting ring is affixed to a middle position of the exterior surface of an inner insert steel section. The outer molded rubber section is an arcuate hollow structure including first and second closed transverse sides, an exterior surface, an interior surface and an open middle layer of space between the exterior surface and interior surface to thereby form two longitudinal openings. On the exterior surface, there is a ring receiving opening for positioning the interconnecting ring of the inner insert steel section, and a plurality of attachment band receiving openings for positioning respective attachment bands when the two halves are connected together. When assembling the first improved interlocking unit to the service loop, the first and second members are affixed together to the service loop by adhesive positioned at the interface of the unit and service loop, and additionally by the fasteners including the attachment bands and screws that penetrate through the respective bands to connect to the respective threaded openings of the respective two inner insert steel sections. In this setting the fasteners serve as first intra-unit affixing means. This variation is installed over the outer covering of the service loops and therefore can b installed on-site at the oil drilling platform.

It is a further object of the present invention second improved interlocking unit to provide each symmetrical member comprising an inner insert steel section and an outer molded rubber section. Each inner insert steel section comprises a plurality of forward extensions and corresponding recesses along the respective two longitudinal interconnecting edges of the two sections, wherein a respective one extension connects in series to a respective one recess. In addition, an identical pin receiving hole penetrates through each forward extension, so that the identical pin holes are aligned with the longitudinal orientation of each of the two longitudinal interconnecting edges.

The outer molded rubber sections also comprise the extensions and corresponding recesses on the respective exterior surface and interior surface along each of the two longitudinal openings. Therefore in manufacturing each member, the extensions and corresponding recesses of the inner insert steel sections are positioned between the respective extensions and corresponding recesses along each of the two longitudinal openings of the outer molded rubber section. When assembling the second improved interlocking unit, the first and second members are first positioned to tightly surround a service loop, wherein their extensions and recesses are respectfully matched to each other, so that first and second pins penetrate through the pin receiving holes of the respective first and second members to thereby connect them together. In this setting, the extensions and corresponding recesses of the respective first and second members, the pin receiving holes on the respective extensions of the first and second inner insert steel sections, and the two pins serve as the respective intra-unit affixing means. In addition, additional adhesive is pasted onto an interface of the unit and service loop. This variation is also installed over the outer covering of the services loops and therefore also can be installed on -site at the location of the oil drilling platform.

It is an additional object of the present invention to provide adhesive positioned between the interior surfaces of the first and second members of the respective first and second improved interlocking units and outer layer of the service loop, so that the adhesion force plays a predominant role to affix the respective improved interlocking units to the service loop. In addition, affixation is further supported by the mechanical forces provided by the intra-unit affixing means including the respective attachment bands, threaded openings and screws of the first improved interlocking unit, and the pins, pin receiving holes and exsertions and corresponding recesses of the second improved interlocking unit.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated:

FIG. 13 is a perspective view of a second improved interlocking unit which is affixed to the service loop;

FIG. 14 is a side view of the second improved interlocking unit which is affixed to the service loop;

FIG. 15 is a transverse cross sectional view of the second improved interlocking unit, wherein the cross-section is taken along a line A-A in FIG. 14.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Figure 1:
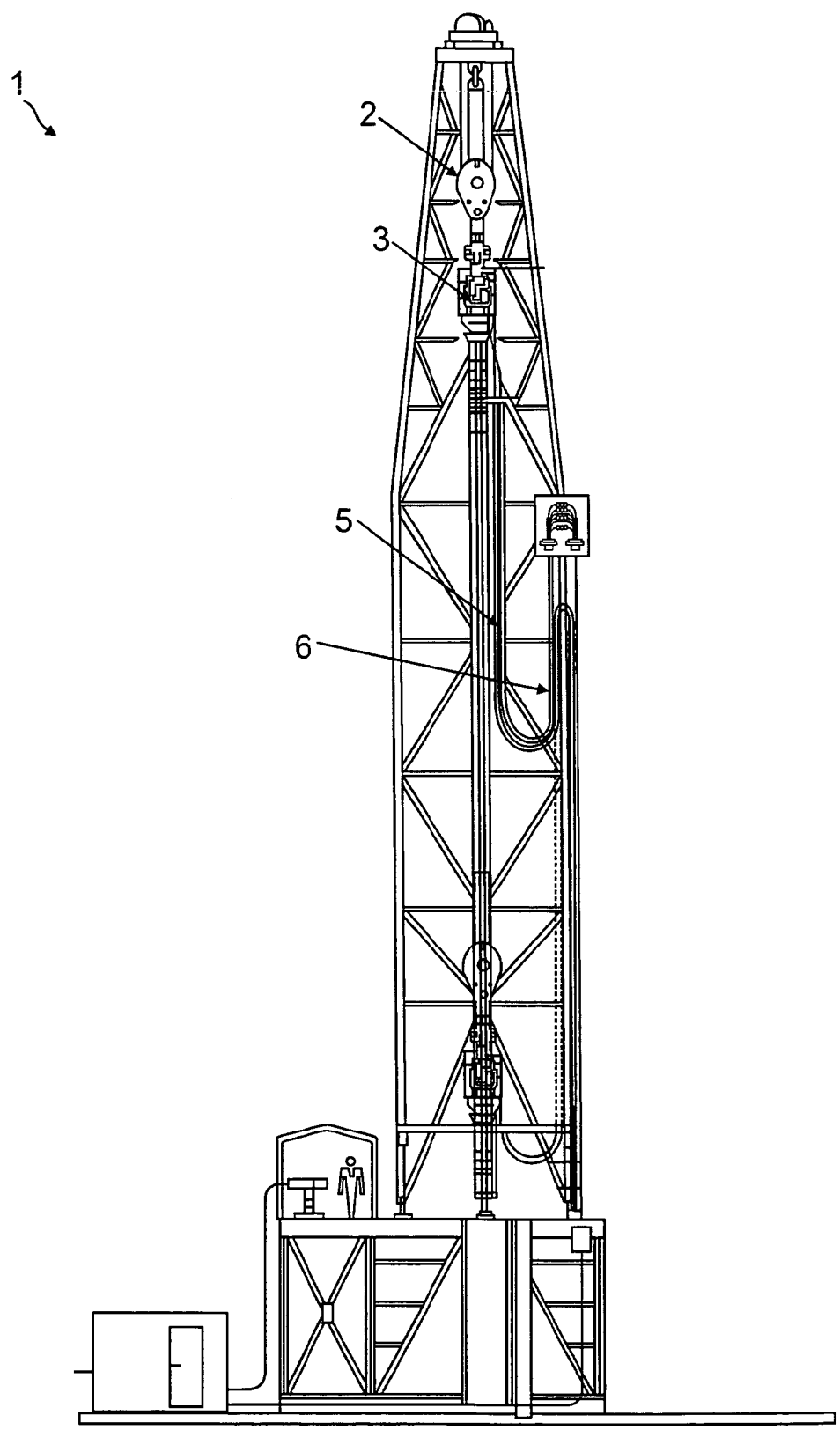
FIG. 1 is a schematic diagram of an oil well drilling tower to illustrate structural sections which are related to the present invention.
Figure 2:
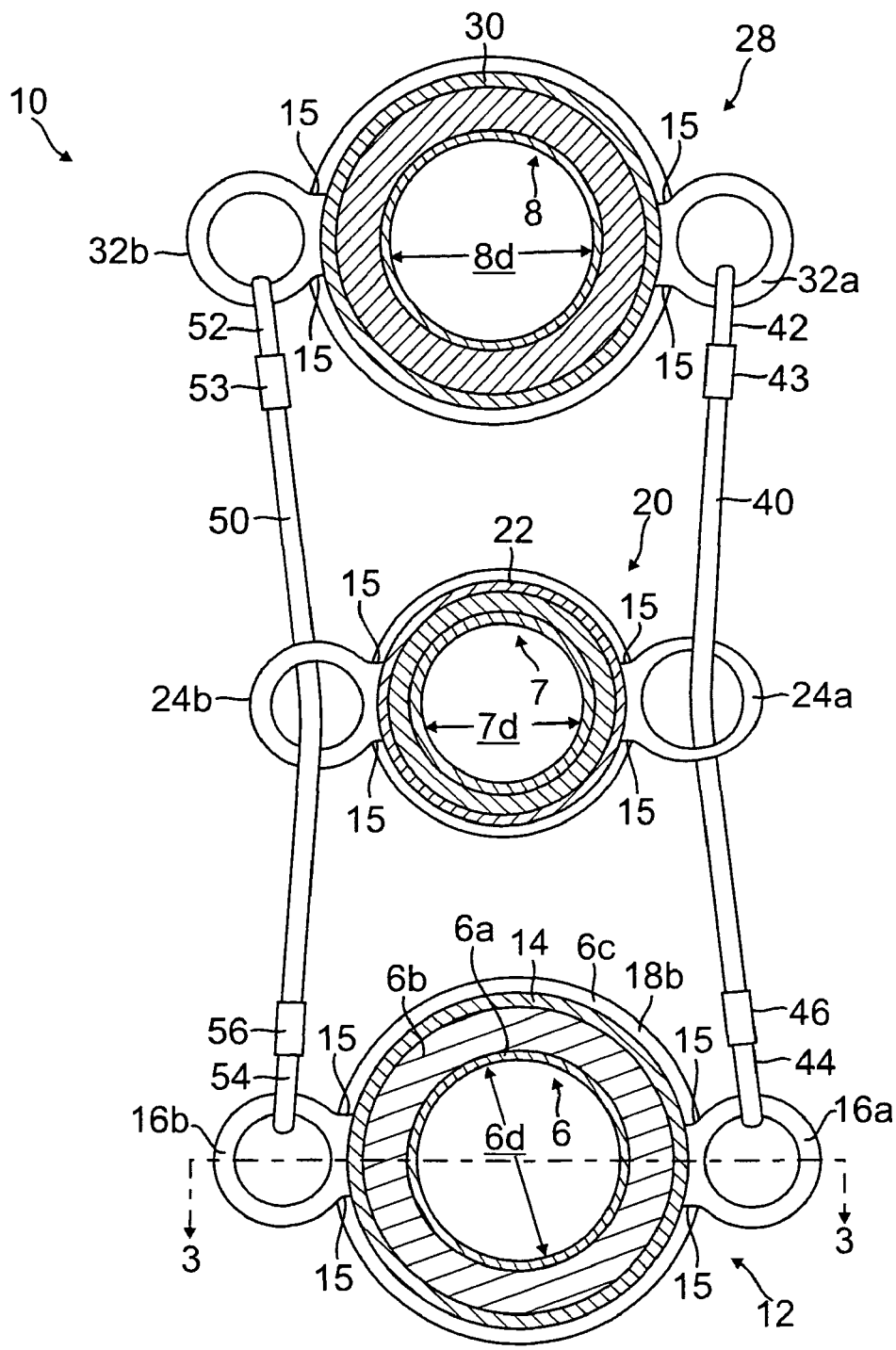
FIG. 2 is an elevational transverse cross sectional view of an apparatus from a preferred embodiment of the present invention apparatus to flexibly restrain service loops of the top drive drilling system in the oil well drilling tower.

Referring to FIG. 2, there is illustrated an apparatus 10 for a preferred embodiment of the present invention apparatus to flexibly restrain service loops, such as a first, second and third service loops 6, 7, and 8 to prevent entangling of the loops when they travel longitudinally during operation of an oil drilling machine.

The apparatus 10 is comprised of three interlocking units 12, 20 and 28, which are flexibly connected to first and second restraining cables 40 and 50, wherein they are all positioned at a same transverse level of the longitudinal service loops. However, it will be appreciated that the present invention apparatus is a grouped system, comprised of a plurality of the identical apparatus 10, wherein each of them is positioned at different longitudinal level to restrain the service loops.

The service loop 6 is comprised of an inner liner 6a, a braid 6b and an outer liner 6c.

Figure 3:
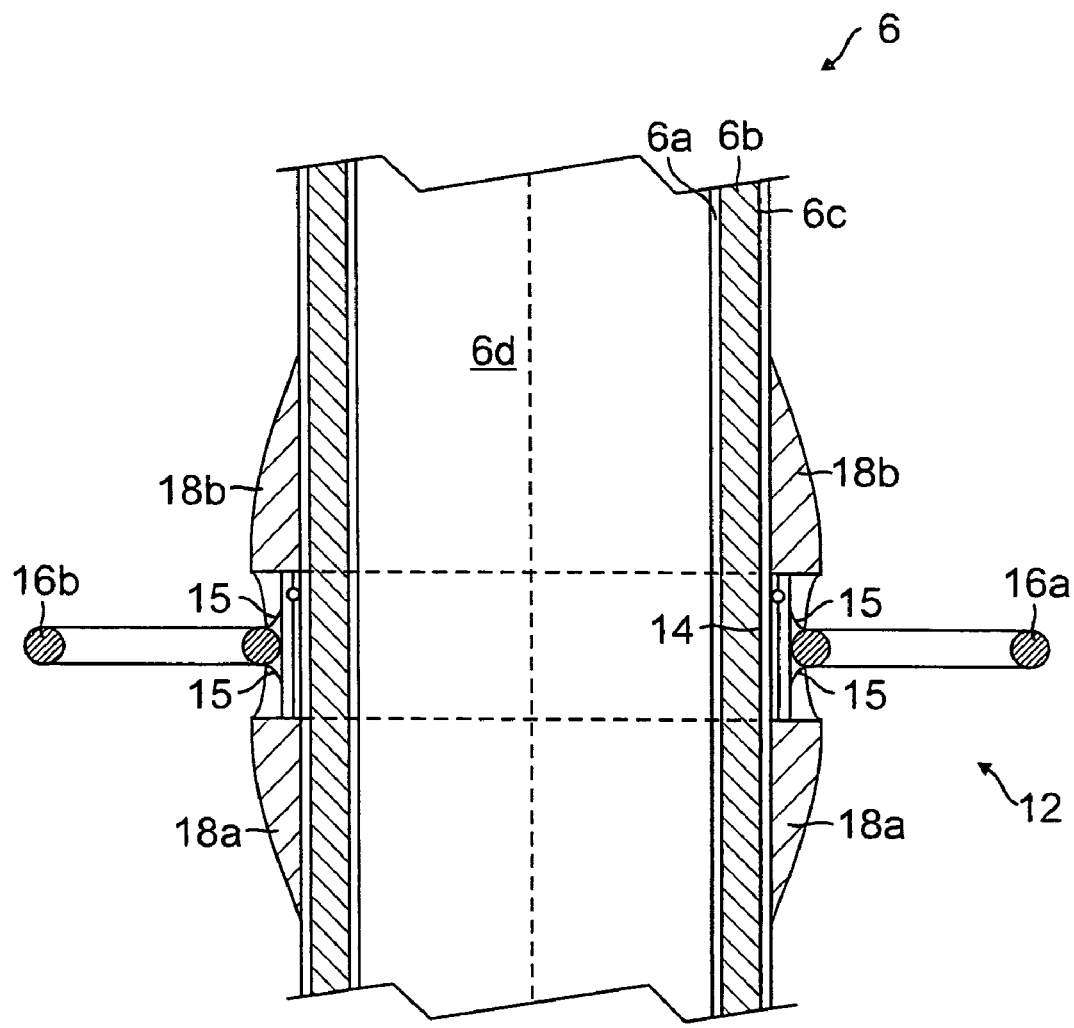
FIG. 3 is an elevational longitudinal cross sectional view of an interlocking unit of the preferred embodiment of the present invention, which is adhesively attached to a part of the service loop.

The first interlocking unit 12, which is additionally illustrated in FIG. 3 for affixing the first service loop 6, is comprised of a steel ring 14, and first and second interconnecting rings 16a and 16b. Described more broadly, the item 14 is an interior retaining means which can be a one piece ring affixed to the braid 6b or as will be described later, a ring formed of a multiplicity of sections, some of which are affixed to the braid 6b. The ring 14 can be made of steel or any other metal or any other desirable material such as synthetic polymer. The steel ring 14 is a circular upward cylindrical wall with appropriate height and thickness. As illustrated in FIGS. 2 and 3, the steel ring 14 is longitudinally positioned to adhesively bond a braid 6b, the middle section of the first service loop 6. The first and second interconnecting rings 16a and 16b which are affixed to the steel ring 14 are positioned to align with a plane which is transverse to the longitudinal cylindrical wall 14 of the steel ring. The interconnecting rings 16a and 16b can be more broadly and respectively be described as a first interconnecting means and a second interconnecting means. The first and second interconnecting means are affixed to and extend transversely from the interior retaining means. In addition, the first and second interconnecting rings 16a and 16b are further positioned wherein their ring diameters are aligned with a diameter of the steel ring 14, so that the first and second interconnecting rings 16a and 16b are symmetrically positioned relative to the centrally positioned steel ring 14.

Although the symmetrically positioned first and second interconnecting rings are preferred, it will be appreciated that they also can be positioned non-symmetrically as long as the interlocking unit 12 can function appropriately. This means that the first and second interconnecting rings 16a and 16b which are affixed to the steel ring 14 are not positioned to align with the same plane which is transverse to the longitudinal cylindrical wall 14 of the steel ring, and the first and second interconnecting rings 16a and 16b are positioned wherein their diameters are not aligned with the diameter of the steel ring 14. In addition, the interconnecting rings 16a and 16b are not limited to have a round shape. In stead, other shapes including a "D" shape are also within the spirit and scope of the present invention.

In the preferred embodiment, the first and second interconnecting rings 16a and 16b are welded to the jacket ring 14, wherein the weld structure is illustrated as the arcuate connecting sections 15. However, they can also be affixed to the steel ring through mechanical connection such as applying fasteners including nuts and bolts. It will be appreciated that after the welding process, the outer liner 6c is attached to the braid 6b of the hose having the inner liner 6a during manufacturing of the service loop 6 incorporating the present invention. There is a gap in the outer liner 6c to accommodate each interconnecting ring 16a.

Referring further to FIG. 3, there are illustrated first and second sections 18a and 18b of an outer jacket which are affixed to the outer liner of the first service loop 6, wherein the first section 18a is positioned below the steel ring 14, and the second section 18b is above the steel ring 14. An object to apply the outer jacket is to enhance affixation of the first interlocking unit 12 to the loop 6 and strengthen mechanical strength of the loop section where the first interlocking unit 12 is positioned. It will be appreciated that, as an alternative variation of the loop structure, the outer jacket can be manufactured as a part of the outer liner 6c of the hose. In addition, the outer jacket can be built in various ways, including being built by using self-adhesive applied to the braid or cord, enhanced thermoplastic or rubber tape to wrap the service loop 7.

Figure 4:
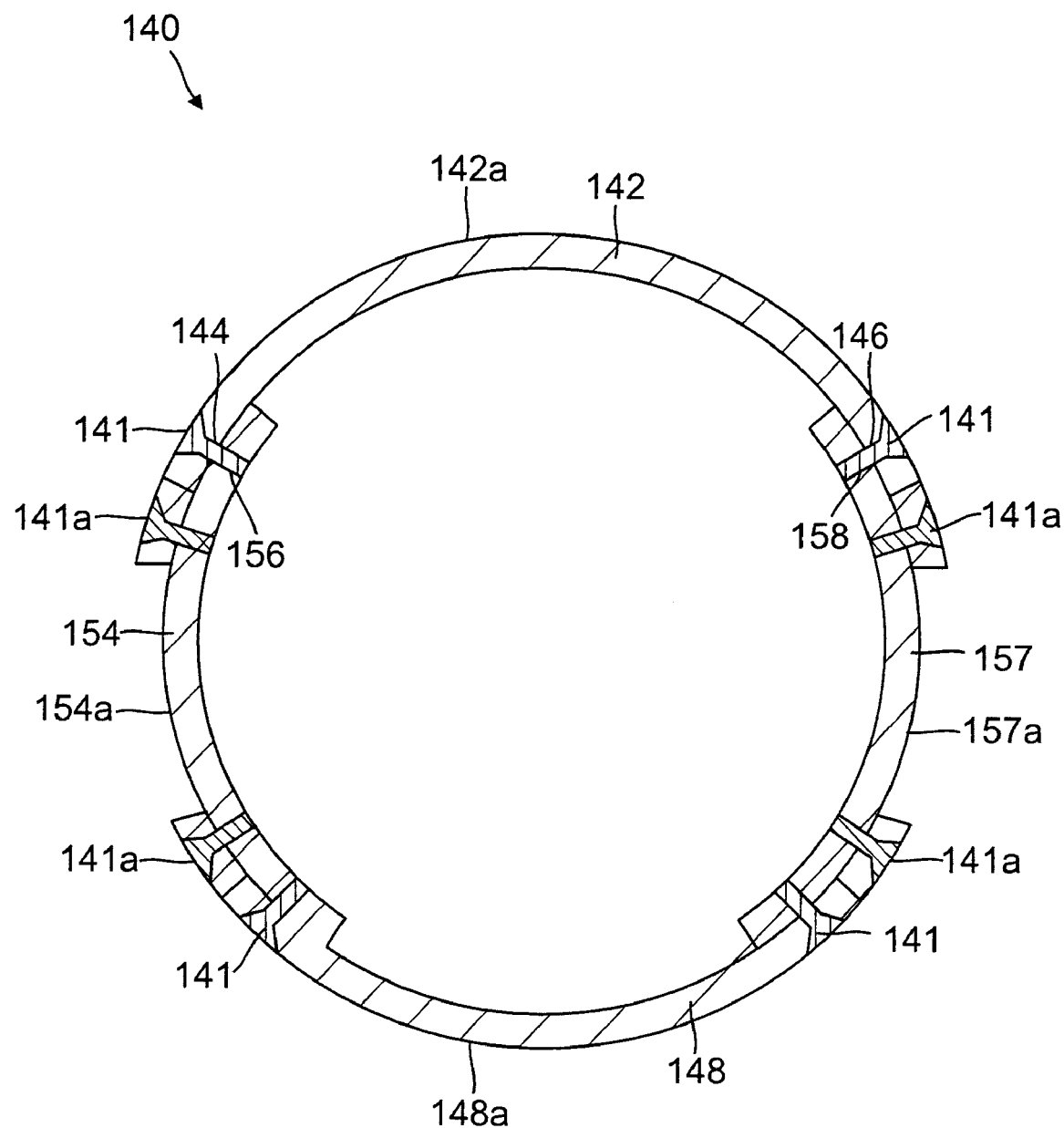
FIG. 4 is an elevational transverse cross sectional view to illustrate structural variations of a steel ring which is a part of the interlocking unit of the present invention.

Reference to FIG. 4 illustrates structural variations of the steel ring 14 or interior retaining means of the present invention. Instead of using the single circular wall of the ring, a varied steel ring 140 is constructed by combining with four pieces of arcuate wall, including first and second outer pieces 142 and 148, and first and second inner pieces 154 and 157.

As illustrated, at lest one flat-head screw 141 penetrates through a first hole 144 at one end of the first outer piece 142 to connect to a second threaded hole 156 at one end of the first inner piece 154. Similarly, at lest one flat-head screw 141 penetrates through a second hole 146 at an opposite end of the first outer piece 142 to connect to a first threaded hole 158 at one end of the second inner piece 157. In a similar fashion, the second outer piece 148 is threadedly connected to the respective first end of first inner piece 154 and second end of the second inner piece 157 with application of the respective flat-head screws. Alternatively, two sets of screws 141 and 141a can be utilized as illustrated in FIG. 4. Alternatively, instead of being affixed by screws 141 and 141a, the components can be welded together.

Following the above illustrated varied steel ring 140, it will be appreciated that a structure of a varied first interlocking unit can be realized, comprising the varied steel ring 140 which is affixed including being welded to the first and second interconnecting rings 16a and 16b. In this embodiment, the first interconnecting ring 16a is affixed to an outer surface 154a of the first inner piece 154 of the arcuate wall, and a second interlocking ring 16b is affixed to an outer surface 157a of the second inner piece 157. Similarly, for an additional embodiment, the first and second interlocking rings 16a and 16b can be affixed to the respective outer surface 142a and 148a of the respective first and second outer pieces 142 and 148 of the arcuate wall. The inner pieces 154 and 157 are also affixed to the braid 66.

It will be appreciated that the above illustrated varied steel ring 140 comprising four individual pieces is just an example of various structural variations of the steel ring 14. In fact, at least two pieces of the arcuate wall can be used for manufacturing a varied steel ring, which can be further manufactured to corresponded with a varied interlocking unit. Therefore, all these variations are within the spirit and scope of the present invention.

It will be further appreciated that an advantage to employing the varied steel ring 140 or the varied interlocking unit is to significantly reduce manufacturing costs since it enables the use of commercially available mechanically strengthened hoses in manufacturing of the service loops incorporating the present invention. Application of the varied steel ring 140 or the varied first interlocking unit only requires cutting a circular strip of the outer liner of the commercial hose to thereby adhesively bond the varied steel ring or the varied first interlocking unit to the braid of the hose, as compared with the process of using the thermoplastic materials to wrap the braid of the entire hose for forming the outer liner of the service loop 6, which is illustrated in FIG. 3 with application of the single circular steel ring 14.

While two sets of rings 16a, 16b, 24a, 24b and 32a and 32b are illustrated and have been disclosed, it is also within the spirit and scope of the present invention to have only one aligned series of rings such as 16a, 24a, and 32a or 16b, 24b and 32b on only one side of the three service loops.

Figure 5:
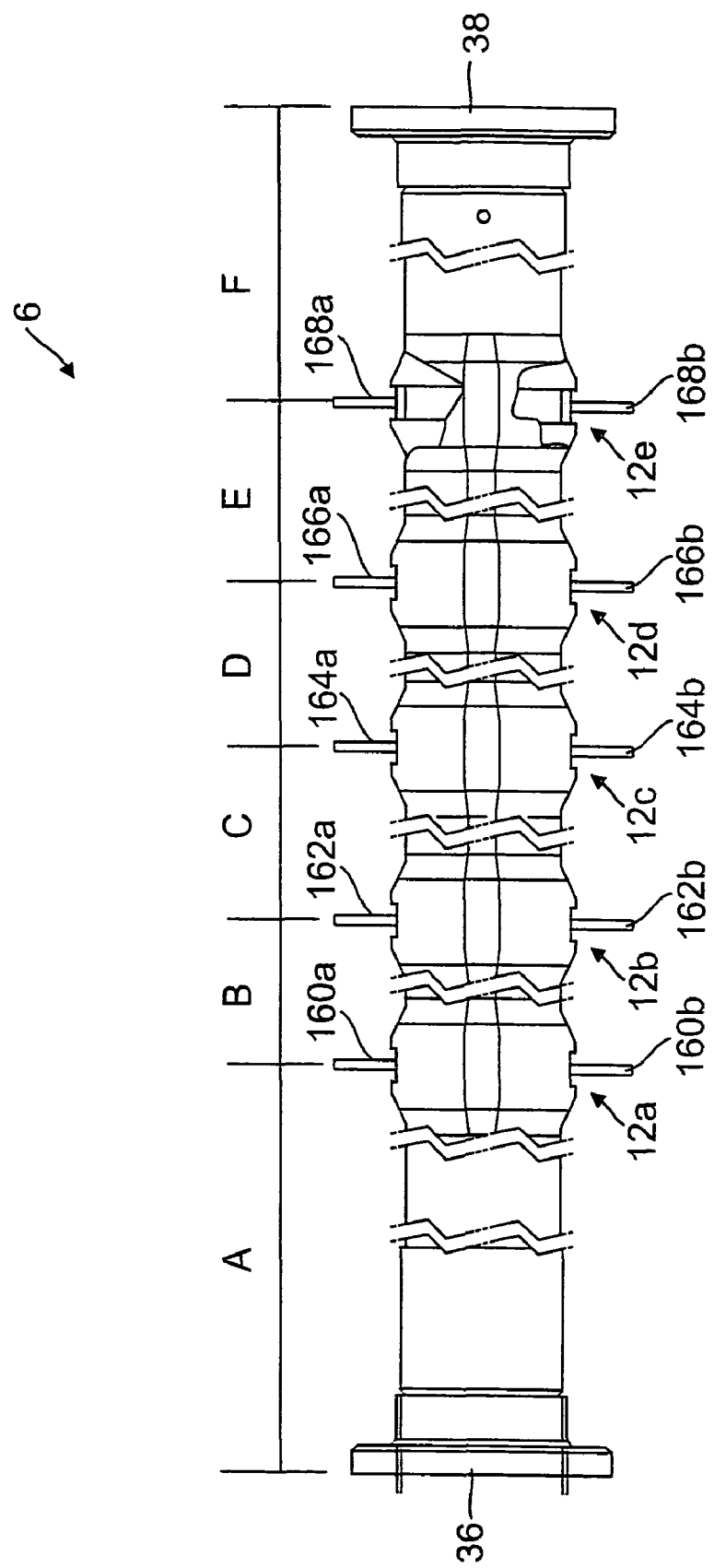
FIG. 5 is a side view of an entire service loop which is equipped with a plurality of interlocking units of the preferred embodiment of the present invention.

Referring to FIG. 5, there is illustrated the structural configuration of the first service loop 6 of the preferred embodiment of the present invention. The first service loop 6 of the hose is comprised of a first flange 36 connected to one end of the hose, five interlocking units 12a, 12b, 12c, 12d and 12e which are separately positioned along a middle section of the hose, and a second flange 38 connected the opposite end of the hose.

It will be appreciated that a service loop could have any appropriate dimensional sizes including the cross-sectional diameter, the loop length and distance between the respective flanges and interlocking units or between two adjacent interlocking units. For example, the first service loop 6 shown in FIG. 5 has a standard length of 86 feet. Referring to the figure, a length of 6 feet marked as "A" is from the first flange 36 to a first interconnecting ring 160a of the first interlocking unit 12a, a length of 9 feet marked as "B" is from the first interconnecting ring 160a to a first interconnecting ring 162a of the second interlocking unit 12b, a length of 10 feet as indicated as "C" is from the second unit 12b to the third unit 12c, a length of 10 feet as indicated as "D" is between the third unit 12c to the fourth unit 12d, a length of 15 feet as indicated as "E" is between the fourth and fifth units 12d and 12e, and a length of 36 feet as indicated as "F" is between the fifth unit 12e to the second flange 38. In application of the service loop 6, the first flange 36 is connected to the top drive, and the second flange 38 is connected to the derrick. Although the above illustration discloses five interlocking units which are positioned onto the service loop, it will be appreciated that at least two interlocking unit are also with the spirit and scope of the present invention. Each of the three service loops 6, 7, and 8 are configured with a multiplicity of spaced apart sets of interconnecting rings as illustrated in FIG. 5.

Referring to FIG. 2 again, there is illustrated second and third interlocking units 20 and 28 which are comprised of the similar structural components as compared with the first unit 12. The second unit 20 includes an interior retaining mean such as a steel ring 22 which affixed to such as adhesively bonded to a braid section of the second service loop 7, and further symmetrically connected to first and second interconnecting means such as first and second interconnecting rings 24a and 24b. The third unit 28 includes an interior retaining means such as steel ring 30 which is affixed to such as adhesively bonded to a braid section of the third service loop 8, and further symmetrically connected to first and second interconnecting mean such as first and second interconnecting rings 32a and 32b. In addition, there are corresponding jackets which are positioned adjacent the respective interlocking units 20 and 28.

As additionally illustrated in FIG. 2, the internal diameters 6d and 8d of the interior opening of the first and third service loops 6 and 8 are larger than the internal diameter 7d of the opening of the second service loop 7, which illustrates their different service functions in the oil drilling processes.

In addition to the interlocking units, a completed apparatus of the preferred embodiment of the present invention is comprised of first and second flexible restraining cables 40 and 50 having appropriate lengths. The first flexible restraining cable 40 at its first end 42 penetrates through the first interconnecting ring 24a of the second interlocking unit 20, and the first end 42 is then fed through the interconnection ring 32a of the third unit 28 and crimped with a crimping structure 43 after forming a loop to connect to the first interconnecting ring 32a of the third unit 28. Its second end 44 is fed through interconnecting ring 16a of the first unit 12a and is crimped with a crimping structure 46 after forming another loop around the first interconnecting ring 16a of the first unit 12. Similarly, the second flexible restraining cable 50 at its first end 52 penetrates through the second interconnecting ring 24b of the second unit 20 and the first end 42 is fed through interconnecting ring 32b and is then crimped at the second interconnecting ring 32b of the third unit 28 with a crimping structure 53. Its second end 54 is fed through interconnecting ring 16b and is crimped at the second interconnecting ring 16b of the first unit 12 with the crimping structure 56.

Therefore, in this embodiment a gap between the second service loop 7 and the first or third service loops 6 and 8 can be arranged to be approximately 3 to 5 inches by providing the first and second flexibly restraining cables 40 and 50 with appropriate lengths.

It will be appreciated that with the application of the apparatus 10 having the flexible restraining cables which are flexibly connected to the interlocking units adhesively bonded to the respective service loops, the first and third service loops 6 and 8 will have a vibration movement with limited transverse moving distance due to flexibility of the restraining cables 40 and 50 which are also limited when the loops move up and down in the longitudinal direction. In addition, the middle loop 7 is allowed to have a sliding movement with a relatively large transverse distance between the first and third service loops 6 and 8, Therefore, the transverse movement of the loops 6, 7 and 8 provides advantages of reduced stresses applied to the apparatus which results in reduced strains on the apparatus, as compared with the rigid clamp systems of the prior art. The advantages of the present invention lead a long usable life of the apparatus with excellent performance wherein all three service loops have a uniform bend radius and path when they travel longitudinally.

It will be appreciated that although there is illustrated five repeating interlocking units for each service loop in FIG. 5, at least two repeating interlocking units for each service loop are within the spirit and scope of the present invention of the apparatus for flexibly restraining the service loops which is comprised of at least two service loops for an oil well drilling machine.

The present invention has been described using three service loops. It will be appreciated that the present invention can be used with at least two service loops and can also be used when there are more than three service loops. While the invention is preferably used with spaced apart sets flexible restraining means which include the interior retaining means and at least one interconnecting means but preferably two interconnecting means, it will be appreciated that the use of one set of flexible restraining means using an interior retaining means and at least one but preferably two interconnecting means used with at least two service loops is within the spirit and scope of the present invention.

Figure 6:
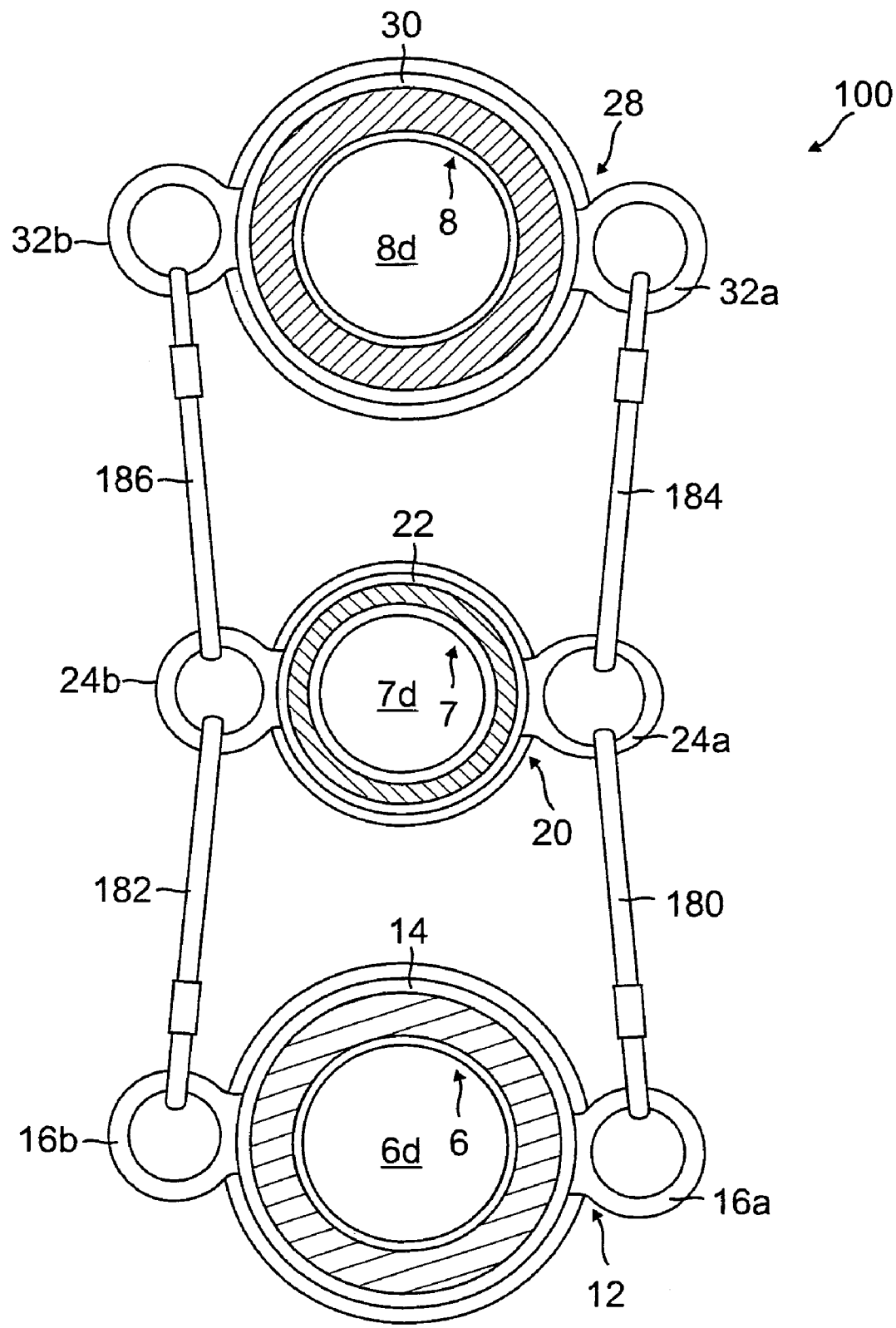
FIG. 6 is an elevational transverse cross sectional view, which illustrates structural variations of the flexible connection within the apparatus of the preferred embodiment of the present invention.

Referring to FIG. 6, there is illustrated a varied apparatus 100 as compared with the preferred apparatus 10. Instead of using two flexible restraining cables, four cables are applied for the varied apparatus 100. A first flexible restraining cable 180 is affixed to the first interconnecting rings 16a and 24a of the respective first and second interlocking units 12 and 20. A second flexibly restraining cable 182 is affixed to the second interconnecting rings 16b and 24b of the respective first and second interlocking units 12 and 20. A third flexible restraining cable 184 is affixed to the first interconnecting rings 24a and 32a of the respective second and third interlocking units 20 and 28. A fourth flexible restraining cable 186 is affixed to the second interconnecting rings 24b and 32b of the respective second and third interlocking units 20 and 28.

It will be appreciated that with the application of the varied apparatus 100 also provides the advantages of the transverse vibrational movement of service loops, as compared with the apparatus 10 in FIG. 2, although movement of the middle service loop 7 of the varied apparatus 100 is more limited.

It will be further appreciated that by using either the apparatus 10 or the varied apparatus 100, all of the service loops 6, 7 and 8 will have bottom loops with a uniform shape of a symmetric water drop when the service loops move up and down. However, such symmetric water drop shaped loops sometimes are not convenient to the operation of the oil well drilling machine. Therefore, there is a need to control the loop shape to form a shape similar to a teardrop shape.

Figure 8:
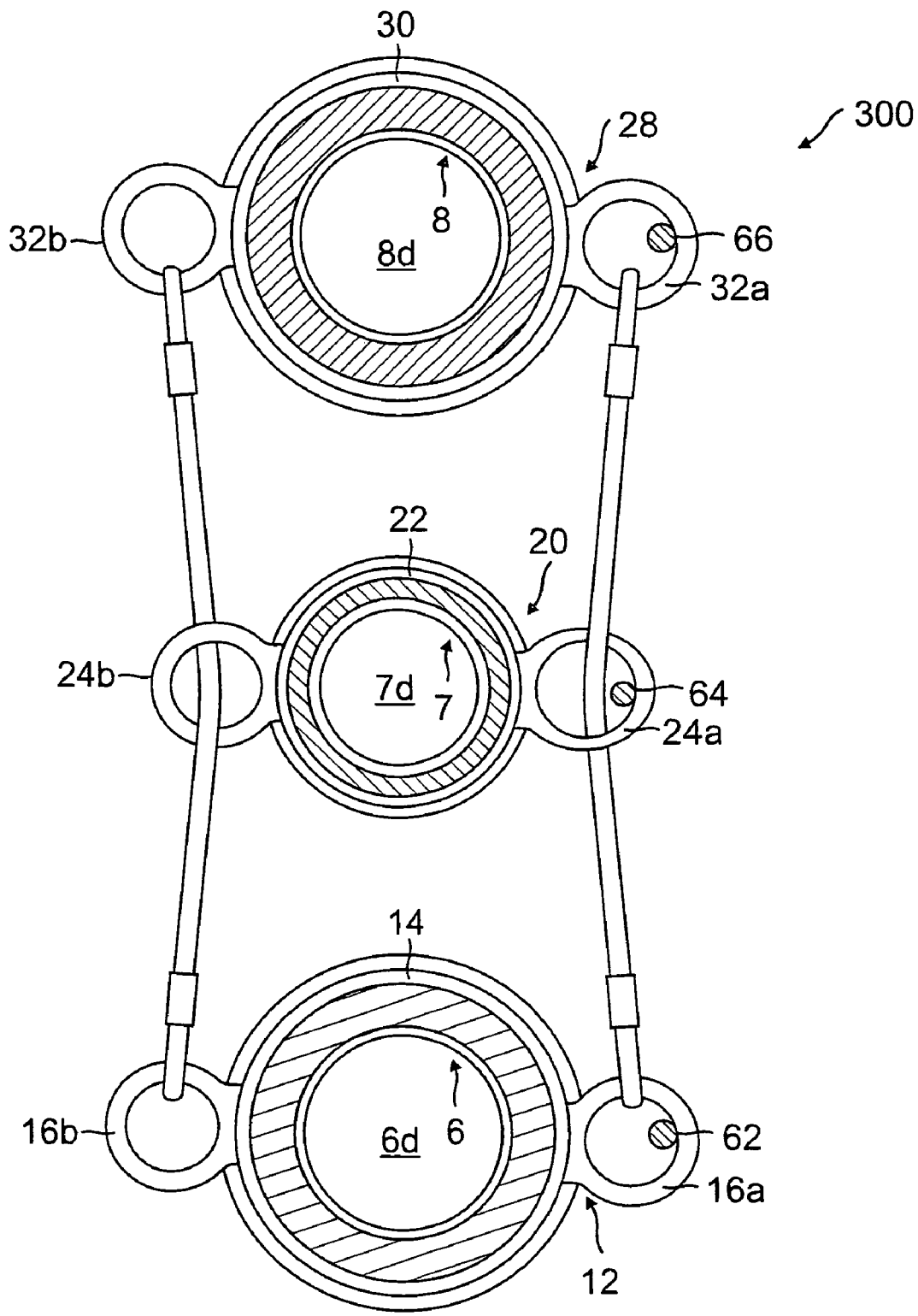
FIG. 8 is an elevational transverse cross sectional view, which shows the apparatus, of the preferred embodiment of the present invention with the addition of three longitudinal cables so that it can control service loops having tear-drop shaped loops, which is further illustrated in FIG. 9.
Figure 9:
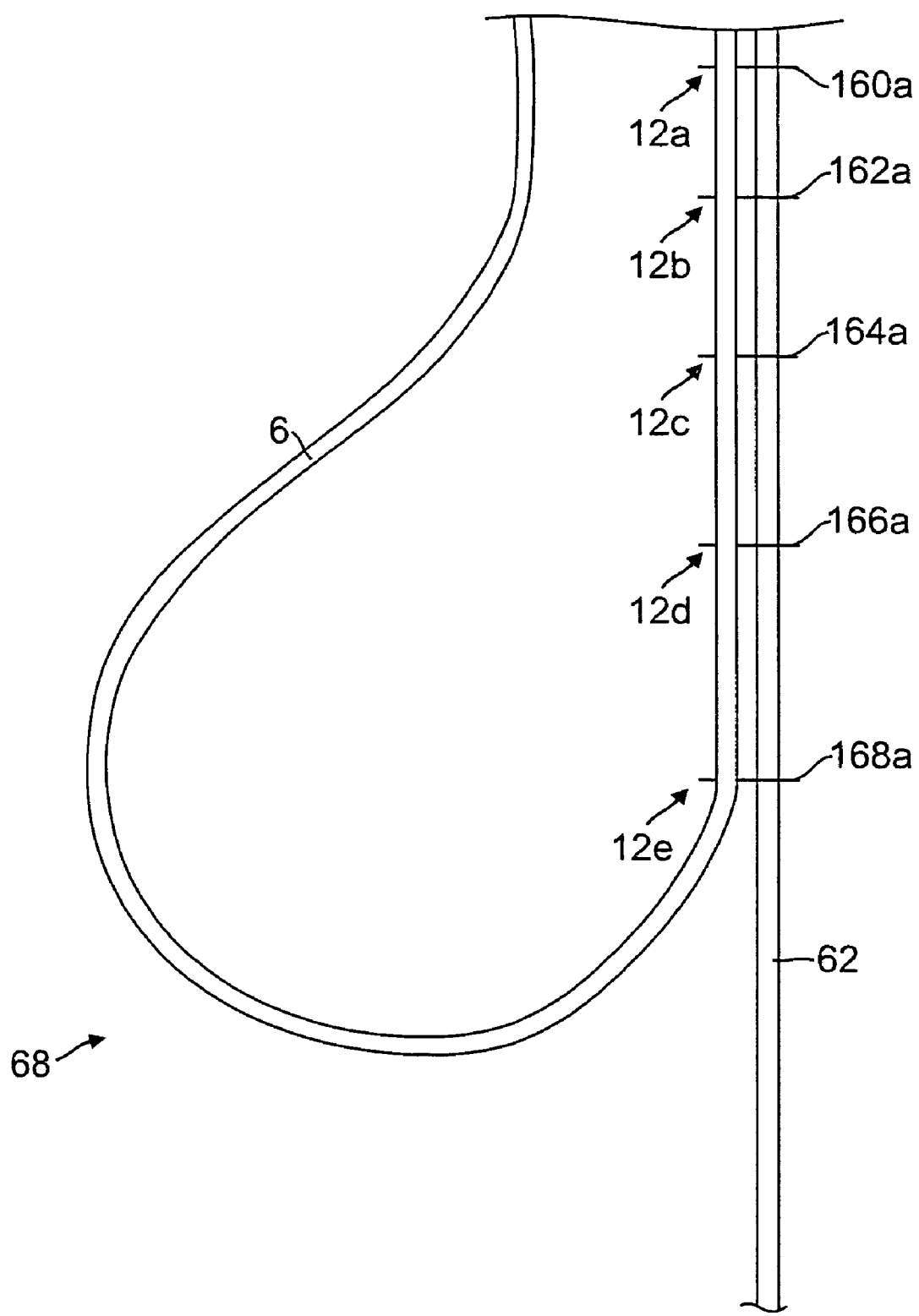
FIG. 9 is a schematic diagram, which uses a service loop as an example to illustrate a controlled shape of the tear-drop of the service loop that is achieved after application of the preferred embodiment of the present invention with an additional longitudinal cable.

Referring to FIGS. 8 and 9, there is illustrated an additional embodiment 300 of the present invention for achieving the controlled tear-drop shaped loops 68 of the service loops in the operation of the oil well drilling machine. The embodiment is comprised of the apparatus having the preferred apparatus 10 with the addition of three longitudinal supporting members 62, 64 and 66. As illustrated in FIG. 8 which discloses the structural configuration of the embodiment 300 in the transverse direction, there are three additional longitudinal supporting members 62, 64 and 66, such as rods or cables where their upper and lower ends are affixed to the oil well drilling tower 1. Each of the members penetrates through the respective first interconnecting rings 16a, 24a and 32a of the respective first, second and third interlocking units 12, 20 and 28. In addition, as illustrated in FIG. 9 which uses the first service loop 6 as an example to disclose the structural configuration of the embodiment 300 in the longitudinal direction, the longitudinally supporting member 62 penetrates through five interconnecting rings 160a, 162a, 164a, 166a and 168a of the respective five first interlocking units 12a, 12b, 12c, 12d and 12e of the preferred service loop 6, which is illustrated in FIG. 5.

Therefore, due to support provided by the longitudinal supporting member 62, the right side of the first service loop 6 is regulated to have an almost straight linear shape to thereby push the left side of the loop leftward, which results in the service loop 6 having the controlled teardrop shape 68.

Figure 7:
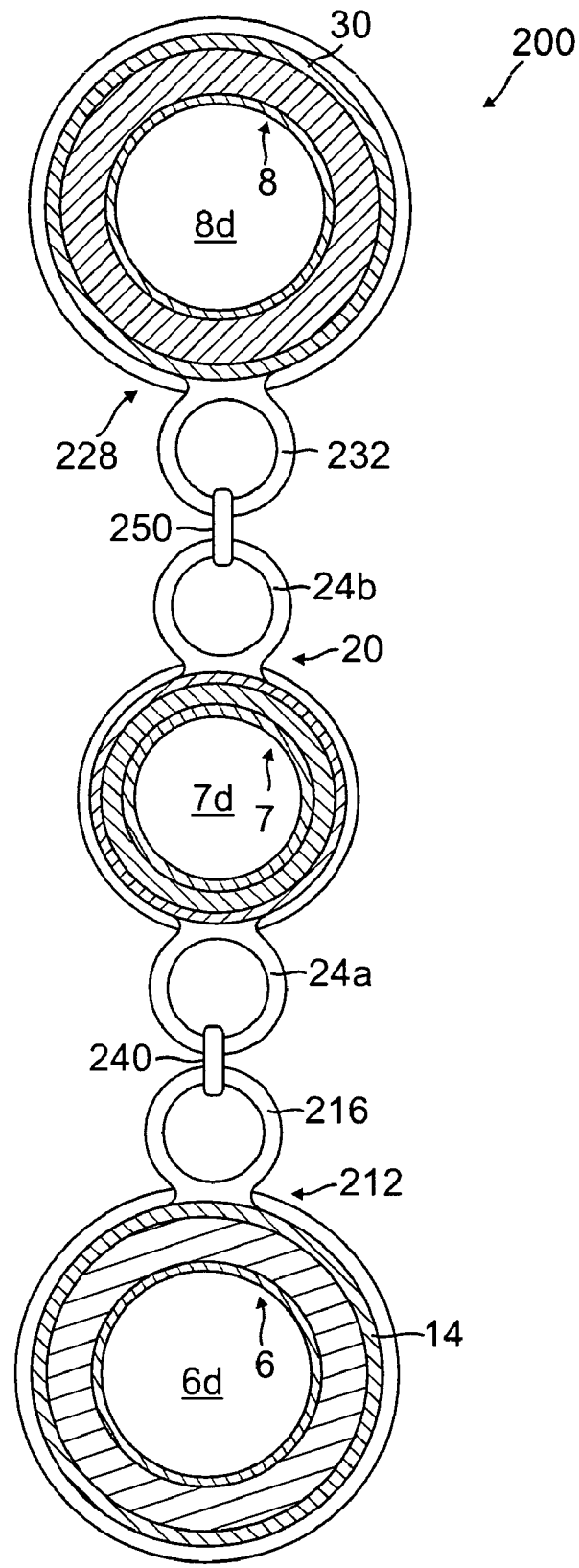
FIG. 7 is an elevational transverse cross sectional view, which illustrates another preferred embodiment of the apparatus from the present invention apparatus to flexibly restrain service loops of the top drive drilling system in an oil drilling tower.

Referring now to FIG. 7, there is illustrated another preferred apparatus 200 of the present invention apparatus. The system containing multiple apparatus 200 can perform equally as the system containing multiple embodiment 10 to flexibly restrain the service loops. It will be appreciated that the apparatus 200 is varied according to the apparatus 10. Therefore, a disclosure of the apparatus 200 will not repeat the structural details which are the same as compared with the apparatus 10, except for varied structural components.

As illustrated, the structural variations of the apparatus 200 include (1) the first and third interlocking units 212 and 228 only have the respective single interconnecting rings 216 and 232 to affix the respective steel rings 14 and 30, (2) two flexibly restraining looped cables 240 and 250 are used, wherein the looped cable 240 connects the interconnecting ring 216 of the first unit 212 and first interconnecting ring 24a of the second interlocking unit 20, and the looped cable 250 connects the interconnecting ring 232 of the third unit 228 and second interconnecting ring 24b of the second interlocking unit 20, and (3) all the interconnection rings are aligned with a central line which penetrates through diameters of the respective service loops 6, 7 and 8. It will be appreciated, with application of a plurality of the apparatus 200, wherein each of them is positioned at different longitudinal levels, the service loops 6, 7, and 8 can be flexibly restrained to thereby have a uniform path and bend radius when they travel longitudinally.

It will be further appreciated that, in a similar fashion as described in FIGS. 8 and 9, with the application of the addition of at least two longitudinal supporting members which penetrate through the respective interconnecting rings 216 and 232 of the first and third interlocking units 212 and 228, or the respective interconnecting rings 216 and second interconnecting ring 24b, or the respective first interconnecting ring 24a and interconnecting ring 232, or the respective first and second interconnecting rings 24a and 24b, it also can achieve the same result of the controlled teardrop shaped loops of the service loops in operation of the oil well drilling machine.

In application of the present invention, although dimensional sizes of the interconnecting rings and cables can vary according particular applications, a preferred ring diameter of the interconnecting rings ranges from one-half inch to three inches, a diameter of the ring cross section ranges from one-eighth inches to a half inch, and a preferred width of the restraining steel cables is ranging from one-eighth inch to one-half inch from regular operations of the oil well drilling machines.

It will be appreciated that the embodiments of the present invention as disclosed in the parent application apparatus significantly improves the operation of the service loops and reduces damage to the service sloops. It also significantly improves the safety for the workers when the oil rig is in operation.

It has been discovered that the nature of the retaining means or steel band as disclosed in the parent application requires a time consuming manufacturing process. By way of example, in the apparatus disclosed in the parent case, the central steel ring 14 of the interlocking unit 12 of the apparatus 10 has to bond to the braid 6b of the service loop 6. This requires a step of opening the outer layer 6c of the service loop, which increases manufacturing time and cost. It is not possible to efficiently perform this process on-site at the oil drilling platform and therefore must be performed at an off site location. To addresses these issues, the improvement disclosed in the present continuation-in-part application provides first and second preferred embodiments for the improved interlocking units which can be affixed over the outer covering of the service loops and therefore can be performed on-site at the oil drilling platform.

Figure 10:
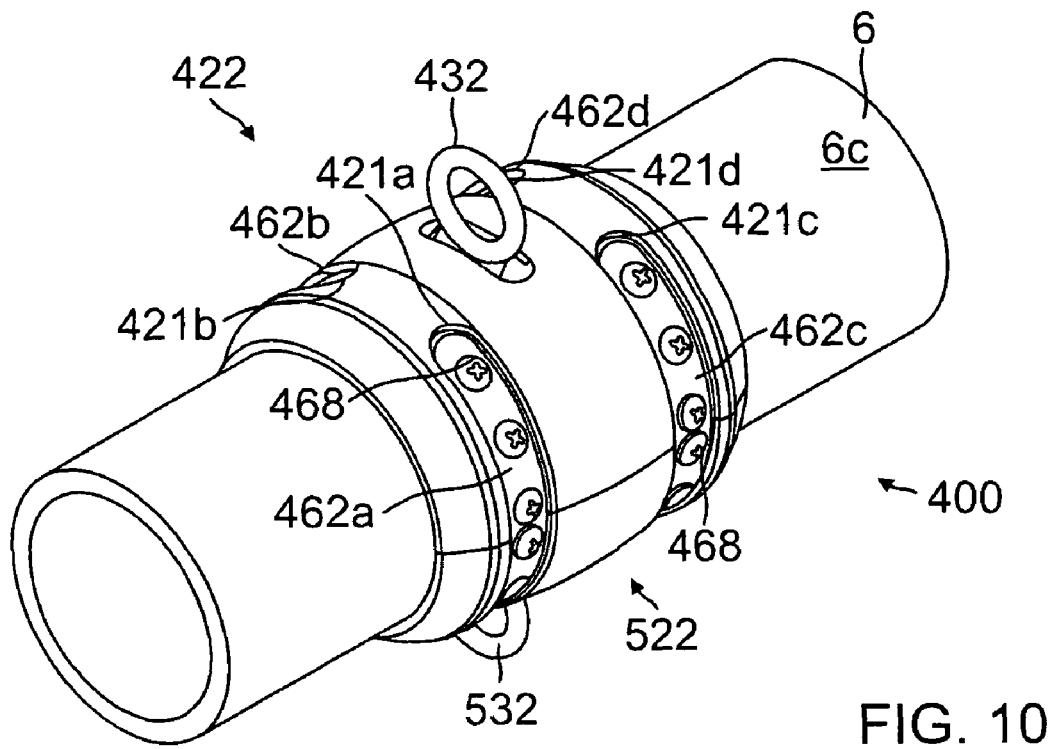
FIG. 10 is a perspective view of a first improved interlocking unit which is affixed to the service loop which forms a part of the continuation-in-part application.
Figure 11:
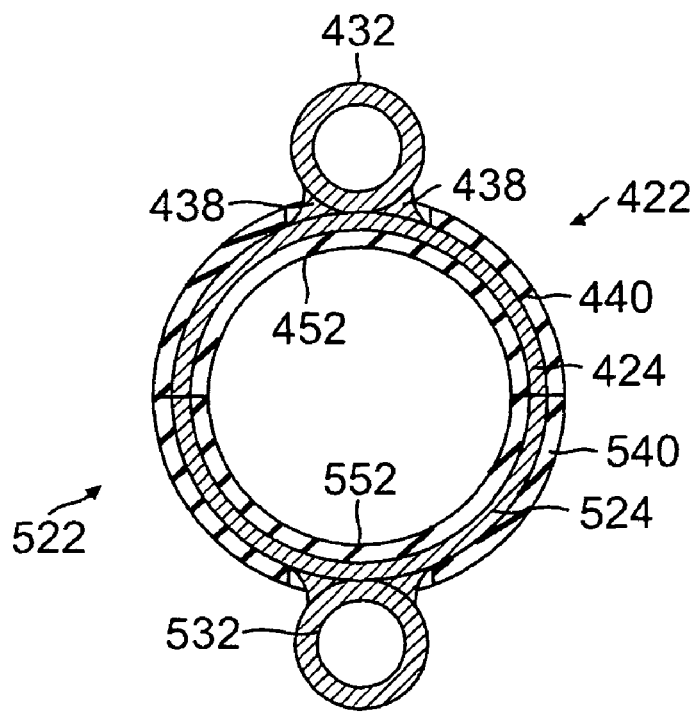
FIG. 11 is a transverse cross sectional view of the first improved interlocking unit, wherein the cross-section is taken across both interconnecting rings.
Figure 12:
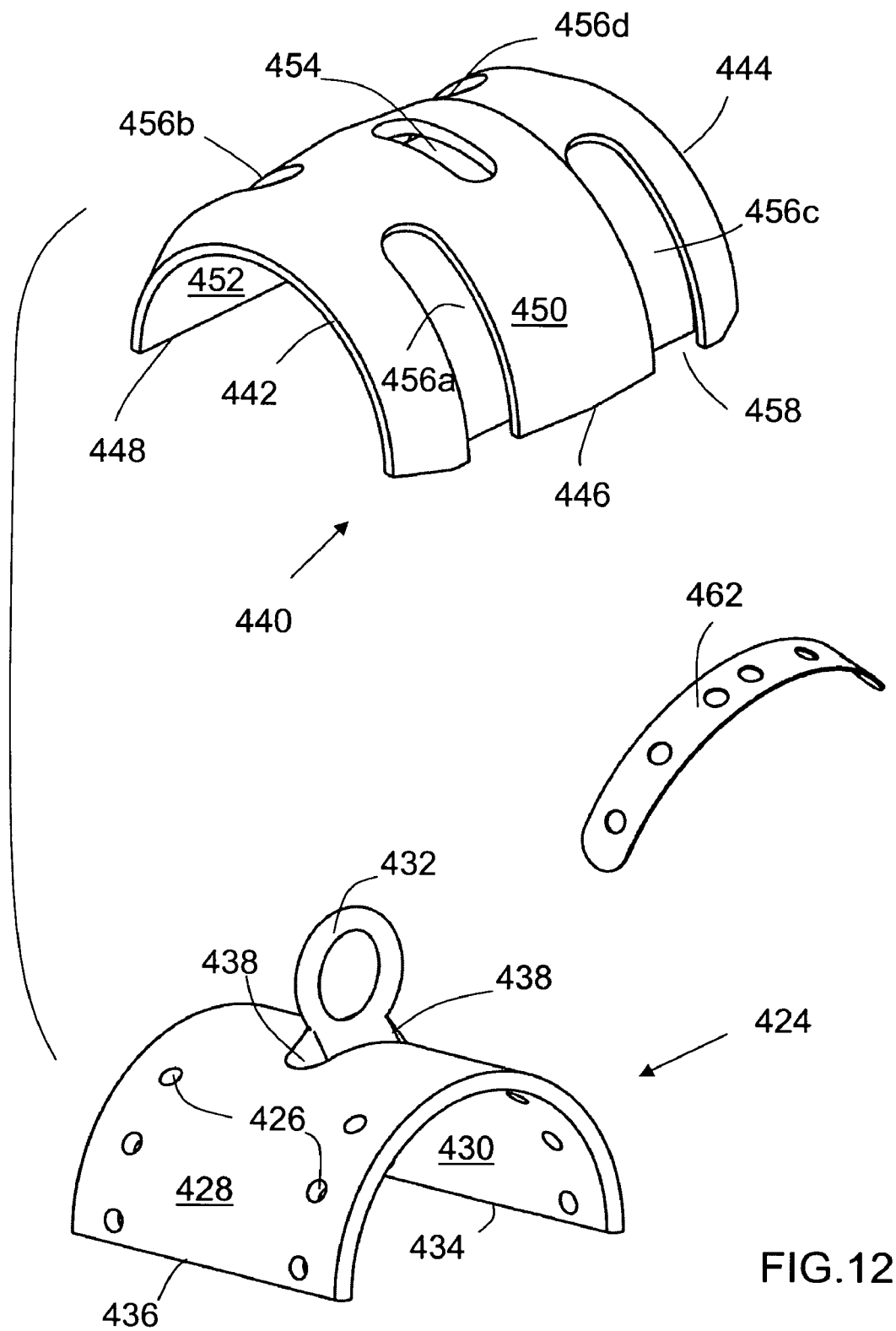
FIG. 12 is an exploded view of a first member of the first improved interlocking unit.

Referring to FIGS. 10 to 12, there is illustrated the first improved interlocking unit 400, which is affixed to the service loop 6. The first improved interlocking unit 400 has a shape similar to an outer covering sleeve, including first and second identical members 422 and 522. As illustrated, the first member 422, which is one half of the unit, is an insert steel enhanced molded rubber structure, comprising a first inner insert steel section 424 and a first outer molded rubber section 440. The first inner insert steel section 424 is positioned so that it is integrated with the first outer molded rubber section 440 to thereby form an integrated structure. The individual components are illustrated in the exploded view of FIG. 12 and are shown assembled in FIGS. 10 and 11. Similarly, the second half member 522 is comprised of a second inner insert steel section 524 and a second outer molded rubber section 540.

The first inner insert steel section 424 is formed as an arcuate plate having a shape of one half of the covering sleeve with appropriate length and thickness. Described more broadly, the steel section 424 is an interior strength enhancing means to strengthen the mechanical properties of the first half member 422. The insert steel section is comprised of an exterior surface 428, an interior surface 430, a first longitudinal side 434, and a second longitudinal side 436. A first interconnecting ring 432 is affixed at a middle position of the exterior surface 428 of the steel section 424, wherein the interconnecting ring is positioned so that it is oriented in a plain which is transverse to the orientation of the respective first and second longitudinal sides 434 and 436. The first interconnecting ring 432 can be more broadly described as a first interconnecting means. In addition, the interconnecting ring 432 is not limited to being formed in a round shape. Other shapes such as a "D" shape are also within the spirit and scope of the present invention.

In a preferred embodiment, the first interconnecting ring 432 is welded the first inner insert steel section 424, wherein the portion is illustrated in FIG. 12 as an arcuate connecting section 438. Alternatively, the ring 432 can also be affixed to the inner insert steel section 424 through a mechanical connection such as being affixed by fasteners such as nuts and bolts.

A plurality of threaded openings 426 are positioned so that they penetrate through the insert steel section to facilitate receiving a respective multiplicity of screws 468, as illustrated in FIG. 10. The screws 468 are threaded through respective threaded openings 426 also threaded through respective openings in attachment bands 462 so that the first and second insert steel sections 422 and 522 are fastened together to thereby form the integrated improved interlocking unit 400. On opposing sides, one half of an attachment band is affixed to steel insert section 422 and one half of an attachment band is affixed to steel insert section 522. This assembly also serves to affix the unit to the service loop 6. Described more broadly, the attachment bands 462, screws 468 and corresponding threaded openings 426 serve as the respective intra-unit affixing means of the improved interlocking unit 400.

The first outer molded rubber section 440 is an arcuate hollow structure having a shape of a half of the axle sleeve. The rubber section 440 includes a first transverse closed end 442, a second transverse end 444, an exterior surface 450, an interior surface 452, and a central open layer of space 458 sandwiched between the exterior surface 450 and interior surface 452. The central open layer of space 458 extends to the longitudinal sides to thereby form a first longitudinal opening 446 and a second longitudinal opening 448 of the rubber section 440.

In addition, the rubber section 440 further comprises a ring receiving opening 454, which is positioned at the middle of the exterior surface 450 of the rubber section 440. The position of the ring receiving opening 454 matches the position of the first interconnecting ring 432 of the first inner insert steel section 424. Therefore, when the insert steel section 424 is positioned so that it is sandwiched within the central open middle layer of space 458 of the rubber section 440, the first interconnecting ring 432 extends through the ring receiving opening 454 of the rubber section 440.

In addition to the ring receiving opening 454, there are a plurality of identical attachment band openings positioned on the exterior surface 450 of the rubber section 440. In a preferred embodiment, there are four identical openings including two upper openings 456a and 456b and two lower openings 456c and 456d. Each identical attachment band opening is in a shape of an elongated transverse slot, which has a first closed end, and a second opened end that connects to one of the respective first and second longitudinal openings 446 and 448. As illustrated in FIGS. 10 and 12, the four transverse openings are for positioning the respective four attachment bands to interlock half sections 422 and 522 together around the service loop 6 to form the assembled interlocking unit 420.

It will be appreciated that the first member 422 can be manufactured by a rubber molding process. Therefore, the exterior molded rubber section 440 and interior insert steel section 424 are integrated together. It will further be appreciated that the second member 522 is symmetrical to the first half member 422, comprising a second outer modeled rubber section 540, and a second inner insert steel section 524 having a second interconnecting ring 532. The first member 422 and the second member 522 are mirror images of one another.

When assembling the improved interlocking unit 400, the first and second members 422 and 522 are first positioned so that they tightly surround the service loop 6 at an appropriate location to form a combined cylindrical structure. In addition, adhesive is applied onto an interface location of the interlocking unit 400 and service loop 6, which includes the interior surface 452 of the first member 422, a corresponding interior surface of the second member 522, and the outer layer 6c of the service loop 6. Described more broadly, the adhesive is adhesion means to adhere the unit 400 and service loop 6 together.

It will be appreciated that two upper attachment band receiving openings of the first member 422 match the respective two upper attachment band receiving openings of the second member 522 to form the respective two combined upper transverse attachment band receiving openings 421a and 421b for positioning the respective two attachment bands 462a and 462b, which is illustrated in FIG. 10.

Similarly, two lower attachment band receiving openings of the first member 422 match the respective two lower attachment band receiving openings of the second member 522 to form the respective two combined lower transverse attachment band receiving openings 421c and 421d for positioning the respective two attachment bands 462c and 462d. Therefore, the first and second members 422 and 522 are fastened when a plurality of screws are threaded into the respective threaded openings of the first inner insert steel section 424 and second inner insert steel section of the respective first and second members 422 and 522.

The adhesion forces provided by the adhesive positioned between the interface of the interlocking unit 400 and the service loop 6 provide further retention support in addition to the mechanical forces provided by the intra-unit affixing means including the attachment bands, screws and threaded openings of the first and second insert strengthening means.

Referring to FIGS. 13-16, there is illustrated second improved interlocking unit 600, comprising the symmetrical first and second members 612 and 712, which are affixed together to surround the service loop 6. As illustrated, the first and second members 612 and 712 of the second improved interlocking unit 600 are almost identical to those of the first improved interlocking unit 400, except for intra-unit affixing means that affixes the first and second member 612 and 712 together to thereby form the unit 600.

The second improved interlocking unit 600 also has a shape similar to an outer covering sleeve. As illustrated, the first member 612, which forms on half of the interlocking unit 600, is an insert steel enhanced molded rubber structure, comprising a first inner insert steel section 614 and a first outer molded rubber section 644. The first inner insert steel section 614 is positioned so that it is sandwiched within the first outer molded rubber section 644 to thereby form an integrated structure. Similarly, the second member 712 is comprised of a second inner insert steel; section 714 and a corresponding second outer molded rubber section.

Figure 16:
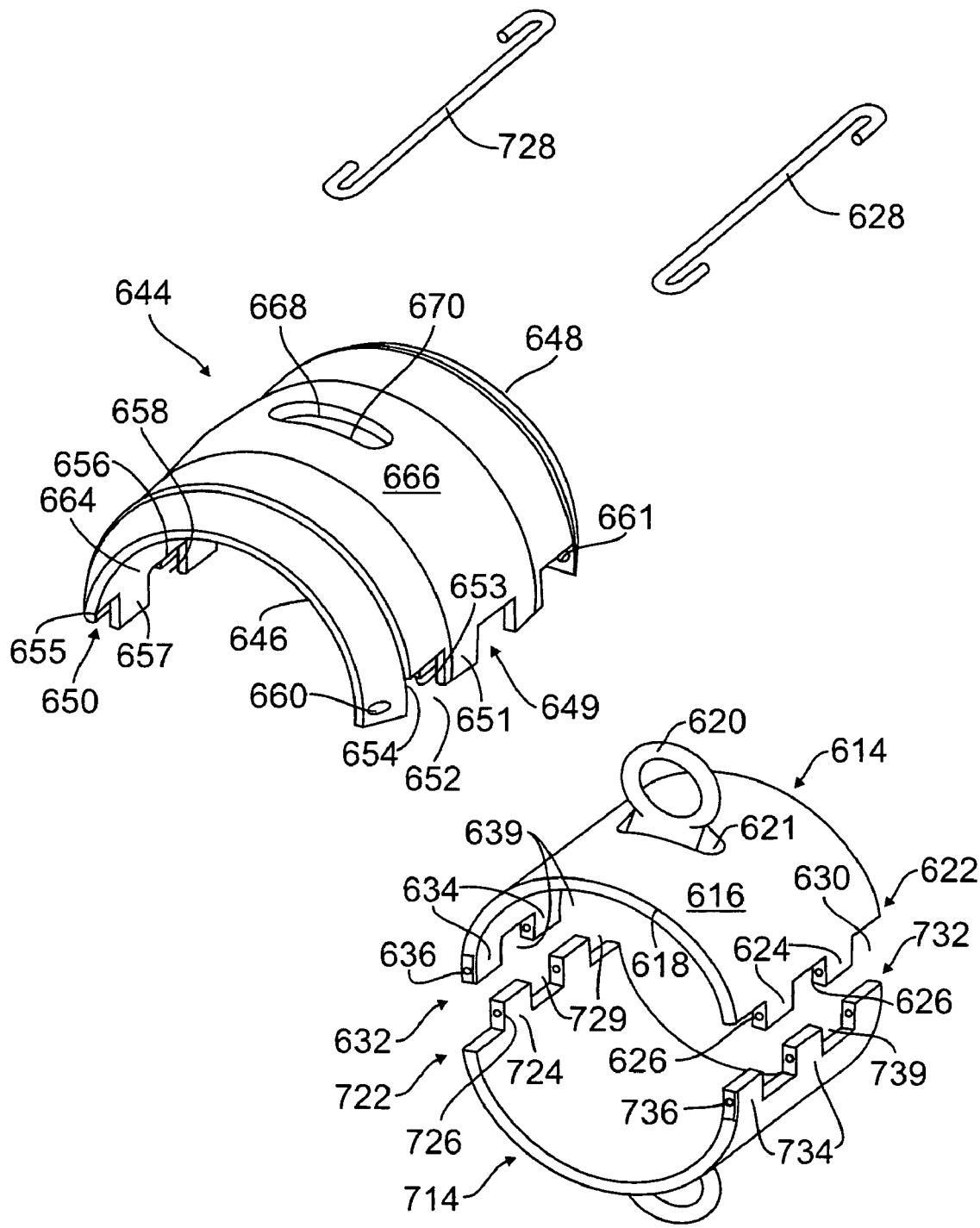
FIG. 16 is an exploded view of components of the second improved interlocking unit, but does not show a second molded rubber.

Referring to FIG. 16, the first inner insert steel section 614, which is symmetrical to the second insert steel section 714, is an arcuate plate having a shape of a half of the axle sleeve with appropriate length and thickness. Described more broadly, the steel section 614 is an interior strength enhancing means which serves to provide mechanical strength to the first half member 612, comprising an exterior surface 616, an interior surface 618, a first longitudinal interconnecting edge 622, and a second longitudinal interconnecting edge 632. These two edges are parallel to each other and are further aligned with the longitudinal orientation of the second improved interlocking unit 600.

In addition, a first interconnecting ring 620 is affixed at a middle location of the exterior surface 616 of the first inner insert steel 614, and is further positioned so that it is aligned with a plain which is transverse to the orientation of the respective first and second longitudinal interconnecting edges 622 and 632. The first interconnecting ring 620 can be more broadly described as a first interconnecting means. In addition, the interconnecting ring 620 is not limited to have a round shape. By way of example, other shapes such as a "D" shape are also within the spirit and scope of the present invention.

In a preferred embodiment, the first interconnecting ring 620 is welded to the first inner insert steel section 614, wherein a welded structure is illustrated as an arcuate connecting section 621. It is also within the spirit and scope of the present invention for the ring 620 to be affixed to the inner insert steel section 614 through mechanical connection means such as fasteners including nuts and bolts.

As further illustrated in FIG. 16, a plurality of forward extensions 624 and corresponding recesses 630 are positioned along the first longitudinal interconnecting edge 622, wherein there is an in-series connection with a respective one extension 624 coming in contact with a respective recess 630. In addition, an identical pin receiving hole 626 penetrates through each forward extension 624. The result is that the identical pin holes 626 are aligned with the longitudinal orientation of the first longitudinal interconnecting edge 622. Similarly, a plurality of forward extensions 634 and corresponding recesses 639 are positioned along the second longitudinal interconnecting edge 632 of the first insert steel section 614, wherein there is an in-series connection with a respective one extension 634 coming in contact with a respective one recess 639. In addition, an identical pin receiving hole 636 penetrates through each forward extension 624, which results in aligning the identical pin receiving holes 636 with the longitudinal orientation of the second longitudinal interconnecting edge 632.

It will be appreciated that, the second insert steel section 712 is identical to the first insert steel 614, comprising first and second longitudinal interconnecting edges 722 and 732. A plurality of forward extensions 724 and corresponding recesses 729 are positioned along the first longitudinal interconnecting edge 722, wherein there is an in-series connection with a respective one extension 724 coming in contact with to a respective one recess 729. In addition, there are pin receiving holes 726 which penetrate through the respective forward extensions 724, which are aligned with the longitudinal orientation of the first longitudinal interconnecting edge 722. A plurality of forward extensions 734 and corresponding recesses 739 are positioned along the second longitudinal interconnecting edge 732, wherein there is an in-series connection with a respective one extension 734 coming in contact with a respective one recess 739. In addition, there are pin receiving holes 736 which penetrate through the respective forward extensions 734, which are aligned with the longitudinal orientation of the second longitudinal interconnecting edge 732.

Therefore, when the first and second inner insert steel sections 614 and 714 are connected together, the first interconnecting edge 622 matches the second interconnecting edge 732 and the second interconnecting edge 632 matches the first interconnecting edge 722. Furthermore, the multiple forward extensions 624 and corresponding recesses 630 of the first inner insert steel section 614 match the respective multiple recesses 739 and corresponding forward extensions 734 of the second inner insert steel 714. The multiple forward extensions 634 and corresponding recesses 639 of the first inner insert steel section 614 match the respective multiple recesses 729 and corresponding forward extensions 724 of the second inner insert steel section 714. Pin receiving holes 626 and 736 of the respective insert steel sections are aligned together, which allows a first pin 628 to penetrate through them to thereby connect the first and second inner insert steel sections together. Pin receiving holes 626 and 726 are aligned together, which allows second pin 728 to penetrate through them to further connect first and second inner insert steel sections together.

Described more broadly, the pins, pin holes and multiple forward extensions and corresponding recesses of the respective first and second inner insert steel sections serve as intra-unit affixing means for the second improved interlocking unit 600.

The first outer molded rubber section 644 is an arcuate hollow structure having a shape of a half of the axle sleeve. The rubber section 644 includes a first transverse closed end 646, a second transverse end 648, an exterior surface 666, and an interior surface 664, wherein between the exterior and interior surfaces, there is an a central middle layer of space 670. The central middle layer of space 670 connects to both longitudinal ends to thereby form a first longitudinal opening 649 and a second longitudinal opening 650 of the rubber section 644.

Surrounding the first longitudinal opening 649, there are multiple forward extensions 651 and corresponding recesses 652 aligned in series on the exterior surface 666, wherein a respective one extension 651 comes in contact with a respective one recess 652. Identical to such structure on the exterior surface, there are multiple forward extensions 653 and corresponding recesses 654 aligned in series on the interior surface 664.

In addition, as illustrated in FIG. 16, aligned with the first longitudinal opening 649 there is a first pin entering passage 660. The passage is positioned at the first transverse closed end 646 adjacent the first longitudinal opening 649. Symmetrical to the first pin entering passage 660, there is a first pin exiting passage 661 positioned at the second transverse closed end 648. It will be appreciated that these two passages serve to locate two ends of a first pin 628 in assembling of the unit 600.

Similarly, surrounding the second longitudinal opening 650 there are multiple forward extensions 655 and corresponding recesses 656 aligned in series on the exterior surface 666, and the multiple forward extensions 657 and corresponding recesses 658 aligned in series on the interior surface 664. In addition, there are paired second pin entering passage and pin existing passage, which are positioned at the respective first and second transverse closed ends 646 and 648 for locating two ends of a second pin 728.

As illustrated in FIG. 16, a ring receiving opening 668 is positioned at the middle of the exterior surface 666 of the rubber section 644, wherein the position of the ring receiving opening 668 is aligned with the position of the first interconnecting ring 620 of the first inner insert steel section 614. Therefore, when the insert steel section 644 is positioned in a sandwich fashion into the open middle layer of space 670 of the rubber section 644, the first interconnecting ring section 620 penetrates through the ring receiving opening 668 of the rubber section 644. Furthermore, the extensions 624 and corresponding recesses 630 of the first insert steel 614 are positioned into the first longitudinal opening 649 of the rubber section. In this setting, the extensions 624 of the steel are positioned between the respective extensions 651 on the exterior surface 666 and extensions 653 on the interior surface 664 of the rubber section 644. Similarly, the recesses 630 of the steel insert section 614 are also appropriately positioned so that they are aligned with the respective recesses 652 on the exterior surface 666 and recesses 654 on the interior surface 664 of the rubber section 644.

It will be appreciated that the first member 612 is manufactured by a rubber molding process. Therefore, the exterior molded rubber section 644 and interior insert steel section 614 are integrated together. It will be further appreciated that the second member 712 is symmetrical to the first member 612, comprising a second outer molded rubber section 744, and a second inner insert steel section 714, with corresponding components as described for the first member 612.

When in assembling of the second improved interlocking unit 600, the first and second members 612 and 712 are first positioned to tightly surround the service loop 6 at an appropriate location, wherein their extensions and recesses are respectfully matched to each other to form a cylindrical structure. In addition, adhesive is placed onto an interface including the interior surface 664 of the first half member 612, an interior surface 764 of the second half member 712, and the outer layer 6c of the service loop 6. Described more broadly, the adhesive is adhesion means to adhere the unit 600 and service loop together.

As illustrated in FIGS. 13-16, the first interconnecting edge 622 of the first inner insert steel 614 of the first member 612 matches the second interconnecting edge 732 of the second inner insert steel 714 of the second member 712. Therefore the first pin 628 penetrates through the pin entering passage 660, the pin receiving holes 626 and 726 of the respective first and second members, and the pin existing passage 661 to thereby connect the first and second members together. In the same way, a second pin 728 penetrates through the pin receiving holes 636 and 726 of the first and second member and through corresponding openings in the rubber section 644. Therefore, the first and second members 612 and 712 are fastened to be a cylindrical interlocking unit 600 after both ends of the respective first and second pins are bent to securely seal the first and second members together.

The adhesion forces provided by the adhesive positioned between the interface of the interlocking unit 600 and the service loop 6 provide further retention support in addition to the mechanical forces provided by the intra-unit affixing means including the attachment bands, screws and threaded openings of the first and second insert strengthening means. This embodiment is affixed over the outer covering of the service loop and therefore can also be performed on-site at the location of the oil drilling platform.

It will be further appreciated that it is within the spirit and scope of the present invention for an improved interlocking unit to have the first and second members be asymmetrical to each other, as long as the intra-unit affixing means can function appropriately. It is also possible for interconnecting rings to not be positioned in the middle of the respective first and second members, and the plane of orientation can also be varied from being transverse to the longitudinal direction of the improved interlocking units.

It will be additionally appreciated that the improved interlocking unit of the present invention significantly increases the mechanical strength of the section of the service loop where the improved interlocking unit is positioned due to the inner insert steel having a relatively large surface area and a shape which accommodates the circular shape of the service loop.

It will further be appreciated that it is within the spirit and scope of the present invention for the molded rubber sections of the respective first and second improved interlocking units to be directly molded to the outer layer of the service loop, which forms a molded rubber interface, as an alternative to applying an adhesive between the service loop and improved interlocking unit. Therefore, the molded rubber interface serves as the adhesion means to adhere the respective improved interlocking units and service loop together.

While variations for the improved interlocking units 400 and 600 described in the continuation-in-part application have been described with affixation to service loop 6, it will be appreciated that units 400 and 600 can be affixed at spaced apart locations on a service loop as illustrated in FIG. 5 and can be interconnected by being affixed to service loops 6, 7 and 8 and interconnected by cables extending through the interconnecting rings as illustrated in FIGS. 2, 6, 7, 8 and 9. All of the interconnecting variations as described in the parent case can be utilized with the improved units 400 and 600 described in the continuation-in part application.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus to be used with service loops in an oil derrick, each service loop having a given length and an outer layer with a given diameter, wherein the apparatus comprises:
   a. a first interlocking unit formed in the shape of a covering sleeve having a given length and having first and second matching half sections, each half section having an outer molded rubber portion enveloping an inner insert steel plate, the outer molded rubber portion having attaching means portions and a central opening, the insert steel plate having an interconnecting member which extends through the opening in the molded rubber portion and extends in a plane perpendicular to the length of the covering sleeve, the two matching half sections aligned around a location on an outer layer of a first service loop and attached together by attaching means to retain the first interlocking unit onto the first service loop with a first interconnecting member from the first half section extending transversely away from the first service loop and a second interconnecting member on the second half section extending transversely away from the first service loop, the first and second interconnecting members extending in opposite directions;
   b. a second interlocking unit formed in the shape of a covering sleeve having a given length and having first and second matching half sections, each half section having an outer molded rubber portion enveloping an inner insert steel plate, the insert steel plate having an interconnecting member which extends through the opening in the molded rubber portion and extends in a plane perpendicular to the length of the covering sleeve, the two matching half section aligned around a location on an outer layer of a second service loop and attached together by attaching means to retain the second interlocking unit onto the second service loop with a first interconnecting member from the first half section extending transversely away from the second service loop and a second interconnecting member on the second half section extending transversely away from the second service loop, the first and second interconnecting members extending in opposite directions;
   c. the first interconnecting member of the first interlocking unit aligned with the first interconnecting member of the second interlocking unit and the second interconnecting member of the first interlocking unit aligned with the second interconnecting member of the second interlocking unit; and d. a first flexible affixation means interconnecting the first interconnecting members of the first and second interlocking means and a second flexible affixation means interconnecting the second interconnecting members of the first and second interlocking means so that the two service loops are flexibly restrained to thereby prevent the two service loops from entangling as they move up and down the oil derrick.

2. An apparatus to be used with service loops in an oil derrick in accordance with claim 1, further having a third service loop having a given length and an outer layer with a given diameter, the service loops arranged so that the second service loop is between the first and third service loops, the apparatus comprising:

a. a third interlocking unit formed in the shape of a covering sleeve having a given length and having first and second matching half sections, each half section having an outer molded rubber portion enveloping an inner insert steel plate, the outer molded rubber portion having a central opening, the insert steel plate having an interconnecting member which extends through the opening in the molded rubber portion and extends in a plane perpendicular to the length of the covering sleeve, the two matching half section aligned around a location on an outer layer of a third service loop and attached together by attaching means to retain the third interlocking unit onto the third service loop with a first interconnecting member from the first half section extending transversely away from the third service loop and a second interconnecting member on the second half section extending transversely away from the third service loop, the first and second interconnecting members extending in opposite directions;

b. the first interconnecting member of the third interlocking unit aligned with the first interconnecting member of the second interlocking unit and the second interconnecting member of the third interlocking unit aligned with the second interconnecting member of the second interlocking unit; and c. the first flexible affixation means interconnecting the first interconnecting members of the first, second and third interlocking means and the second flexible affixation means interconnecting the second interconnecting members of the first, second and third interlocking means so that the three service loops are flexibly restrained to thereby prevent the three service loops from entangling as they move up and down the oil derrick.

3. The apparatus in accordance with claim 2 wherein each interlocking unit is further affixed to each interlocking unit's respective service loop by adhesive applied between the outer surface of the service loop and an interior surface of the outer rubber molded portion.

4. The apparatus in accordance with claim 2 wherein for each interlocking unit, the attaching means further comprises spaced apart recessed attaching means receiving areas formed in the outer molded rubber portion and aligned openings in the inner steel plate and a band respectively received within a respective recessed area of the outer molded rubber portion and affixed by screws extending through openings in a band and through respective aligned openings in the inner insert steel plate and into the service loop.

5. The apparatus in accordance with claim 2 wherein for each interlocking unit, each half of the outer molded rubber portion has spaced apart interlocking exterior members which interlock with each other when the two matching half sections are attached together.

6. The apparatus in accordance with claim 5 wherein the for each interlocking unit, the two matching half sections are locked together by connecting pins extending through receiving openings in the outer molded rubber portions.

7. The apparatus in accordance with claim 2 wherein the interconnecting member for each interlocking unit comprises a ring with a central opening area through which the respective flexible affixation means is inserted.

8. The apparatus in accordance with claim 2 wherein the first flexible affixation means and the second flexible affixation means are each a cable respectively extending through a respective opening in the first, second, and third interconnecting members.

9. The apparatus in accordance with claim 2 wherein the first flexible affixation means and the second flexible affixation means are each a first cable respectively extending through a respective opening in the first interconnection members of the first and second interlocking units and a second cable respectively extending through a respective opening in the first interconnecting members of the second and third interlocking units.

10. The apparatus in accordance with claim 1 wherein each interlocking unit is further affixed to each interlocking unit's respective service loop by adhesive applied between the outer surface of the service loop and an interior surface of the outer rubber molded portion.

11. The apparatus in accordance with claim 1 wherein for each interlocking unit, the attaching means further comprises spaced apart recessed attaching means receiving areas formed in the outer molded rubber portion and aligned openings in the inner steel plate and a band respectively received within a respective recessed area of the outer molded rubber portion and affixed by screws extending through openings in a band and through respective aligned openings in the inner insert steel plate and into the service loop.

12. The apparatus in accordance with claim 1 wherein for each interlocking unit, each half of the outer molded rubber portion has spaced apart interlocking exterior members which interlock with each other when the two matching half sections are attached together.

13. The apparatus in accordance with claim 7 wherein the for each interlocking unit, the two matching half sections are locked together by connecting pins extending through receiving openings in the outer molded rubber portions.

14. The apparatus in accordance with claim 1 wherein the interconnecting member for each interlocking unit comprises a ring with a central opening area through which the respective flexible affixation means is inserted.

15. The apparatus in accordance with claim 1 wherein the first flexible affixation means and the second flexible affixation means are each a cable respectively extending through a respective opening in the first and second interconnecting members.

16. An apparatus to be used with service loops in an oil derrick, each service loop having a given length and an outer layer with a given diameter, the apparatus having a multiplicity of spaced apart sets of flexible restraining means affixed at spaced apart locations along the length of each of each service loop, each set of flexible restraining means comprising:

a. a first interlocking unit formed in the shape of a covering sleeve having a given length and having first and second matching half sections, each half section having an outer molded rubber portion enveloping an inner insert steel plate, the outer molded rubber portion having a central opening, the insert steel plate having openings which are aligned with the respective recessed attaching means areas on the outer rubber portion and an interconnecting member which extends through the opening in the molded rubber portion and extends in a plane perpendicular to the length of the covering sleeve, the two matching half section aligned around a location on an outer layer of a first service loop and attached together by attaching means to retain the first interlocking unit onto the first service loop with a first interconnecting member from a first half section extending transversely away from the first service loop and a second interconnecting member on a second half section extending transversely away from the first service loop, the first and second interconnecting members extending in opposite directions;

b. a second interlocking unit formed in the shape of a covering sleeve having a given length and having first and second matching half sections, each half section having an outer molded rubber portion enveloping an inner insert steel plate, the outer molded rubber portion having a central opening, the insert steel plate having an interconnecting member which extends through the opening in the molded rubber portion and extends in a plane perpendicular to the length of the covering sleeve, the two matching half section aligned around a location on an outer layer of a second service loop and attached together by attaching means to retain the second interlocking unit onto the second service loop with a first interconnecting member from the first half section extending transversely away from the second service loop and a second interconnecting member on the second half section extending transversely away from the second service loop, the first and second interconnecting members extending in opposite directions;

c. for each set of flexible restraining means, the first interconnecting member of the first interlocking unit aligned with the first interconnecting member of the second interlocking unit and the second interconnecting member of the first interlocking unit aligned with the second interconnecting member of the second interlocking unit; and d. for each set of flexible restraining means, a first flexible affixation means interconnecting the first interconnecting members of the first and second interlocking means and a second flexible affixation means interconnecting the second interconnecting members of the first and second interlocking means so the multiplicity of sets of flexible restraining means cause the two service loops to be flexibly restrained at a multiplicity of locations along the length of the two service loops to thereby prevent the two service loops from entangling as they move up and down the oil derrick.

17. An apparatus to be used with service loops in an oil derrick in accordance with claim 16, further having a third service loop having a given length and an outer layer with a given diameter, the service loops arranged so that the second service loop is between the first and third service loops, the third service loop having a multiplicity of spaced apart flexible restraining means affixed at spaced apart locations along the length of the third service loop, each of the flexible restraining means on the third service loop comprising:

a. a third interlocking unit formed in the shape of a covering sleeve having a given length and having first and second matching half sections, each half section having an outer molded rubber portion enveloping an inner insert steel plate, the outer molded rubber portion having a central opening, the insert steel plate having an interconnecting member which extends through the opening in the molded rubber portion and extends in a plane perpendicular to the length of the covering sleeve, the two matching half section aligned around a location on the outer layer of a third service loop and attached together by attaching means to retain the third interlocking unit onto the third service loop with a first interconnecting member from a first half section extending transversely away from the third service loop and a second interconnecting member on a second half section extending transversely away from the third service loop, the first and second interconnecting members extending in opposite directions;

b. for each set of flexible restraining means, the first interconnecting member of the third interlocking unit aligned with the first interconnecting member of the second interlocking unit and the second interconnecting member of the third interlocking unit aligned with the second interconnecting member of the second interlocking unit; and c. for each set of flexible restraining means, the first flexible affixation means interconnecting the first interconnecting members of the first, second, and third interlocking means and the second flexible affixation means interconnecting the second interconnecting members of the first, second, and third interlocking means so the multiplicity of sets of flexible restraining means cause the three service loops to be flexibly restrained at a multiplicity of locations along the length of the three service loops to thereby prevent the three service loops from entangling as they move up and down the oil derrick.

18. The apparatus in accordance with claim 17 wherein each interlocking unit is further affixed to each interlocking unit's respective service loop by adhesive applied between the outer surface of the service loop and an interior surface of the outer rubber molded portion.

19. The apparatus in accordance with claim 17 wherein the attaching means for each interlocking unit further comprises a band respectively received within a respective recessed area of the outer molded rubber portion and affixed by screws extending through openings in a band and through respective aligned openings in the inner insert steel plate and into the service loop.

20. The apparatus in accordance with claim 17 wherein for each interlocking unit, each half of the outer molded rubber portion has spaced apart interlocking exterior members which interlock with each other when the two matching half sections are attached together.

21. The apparatus in accordance with claim 20 wherein the for each interlocking unit, the two matching half sections are locked together by connecting pins extending through receiving openings in the outer molded rubber portions.

22. The apparatus in accordance with claim 17 wherein the interconnecting members for each interlocking unit comprises a ring with a central opening area through which a respective flexible affixation means is inserted.

23. The apparatus in accordance with claim 17 wherein the first flexible affixation means and the second flexible affixation means are each a cable respectively extending through a respective opening in the first, second and third interconnecting members.

24. The apparatus in accordance with claim 17 wherein the first flexible affixation means and the second flexible affixation means are each a first cable respectively extending through a respective opening in the first interconnecting members of the first and second interlocking units and a second cable respectively extending through a respective opening in the first interconnecting member of the second and third interlocking units.

25. The apparatus in accordance with claim 17, further comprising:
   a. a first longitudinal supporting member affixed to the oil derrick and extending through an aligned opening in a respective first interconnecting member of each set of flexible restraining means of the first service loop;
   b. a second longitudinal supporting member affixed to the oil derrick and extending through an aligned opening in a respective first interconnecting member of each set of flexible restraining members of the second service loop; and
   c. a third longitudinal supporting member affixed to the oil derrick and extending through an aligned opening in a respective first interconnecting member of each set of flexible restraining means of the third service loop.

26. The apparatus in accordance with claim 16 wherein each interlocking unit is further affixed to each interlocking unit's respective service loop by adhesive applied between the outer surface of the service loop and an interior surface of the outer rubber molded portion.

27. The apparatus in accordance with claim 16 wherein the attaching means for each interlocking unit further comprises a band respectively received within a respective recessed area of the outer molded rubber portion and affixed by screws extending through openings in the band and through respective aligned openings in the inner insert steel plate and into the service loop.

28. The apparatus in accordance with claim 16 wherein for each interlocking unit, each half of the outer molded rubber portion has spaced apart interlocking exterior members which interlock with each other when the two matching half sections are attached together.

29. The apparatus in accordance with claim 28 wherein the for each interlocking unit, the two matching half sections are locked together by connecting pins extending through receiving openings in the outer molded rubber portions.

30. The apparatus in accordance with claim 16 wherein the interconnecting members for each interlocking unit comprises a ring with a central opening area through which a respective flexible affixation means is inserted.

31. The apparatus in accordance with claim 16 wherein the first flexible affixation means and the second flexible affixation means are each a cable respectively extending through a respective opening in the first and third interconnecting members.

32. The apparatus in accordance with claim 16 wherein the first flexible affixation means and the second flexible affixation means are each a first cable respectively extending through a respective opening in the first interconnecting members of the first and second interlocking units and a second cable respectively extending through a respective opening in the first interconnecting members of the second and third interlocking units.

33. The apparatus in accordance with claim 3, further comprising:
   a. a first longitudinal supporting member affixed to the oil derrick and extending through an aligned opening in a respective first interconnecting member of each set of flexible restraining means of the first service loop; and
   b. a second longitudinal supporting member affixed to the oil derrick and extending through an aligned opening in a respective first interconnecting member of each set of flexible restraining members of the second service loop.

* * * * *